(12) United States Patent
Marck et al.

(10) Patent No.: US 7,491,752 B2
(45) Date of Patent: *Feb. 17, 2009

(54) PHOTOACTIVE MATERIALS

(75) Inventors: Guy Marck, Schlierbach (FR); Hubert Seiberle, Weil am Rhein (DE); Mohammed Ibn-Elhaj, Allschwil (CH)

(73) Assignee: Rolic AG, Zug (CH)

( * ) Notice: Subject to any disclaimer, the term of this patent is extended or adjusted under 35 U.S.C. 154(b) by 448 days.

This patent is subject to a terminal disclaimer.

(21) Appl. No.: 10/484,260

(22) PCT Filed: Jul. 15, 2002

(86) PCT No.: PCT/CH02/00391

§ 371 (c)(1),
(2), (4) Date: Jul. 9, 2004

(87) PCT Pub. No.: WO03/008472

PCT Pub. Date: Jan. 30, 2003

(65) Prior Publication Data

US 2004/0265742 A1 Dec. 30, 2004

(30) Foreign Application Priority Data

Jul. 17, 2001 (EP) .................... 01810709

(51) Int. Cl.
- *C08F 2/46* (2006.01)
- *C08J 3/28* (2006.01)
- *C09K 11/06* (2006.01)
- *C09K 19/00* (2006.01)
- *C09K 17/18* (2006.01)

(52) U.S. Cl. .............. 522/178; 522/162; 522/161; 522/164; 522/167; 522/168; 522/170; 522/172; 522/173; 522/174; 522/175; 522/176; 522/179; 522/180; 522/181; 522/904; 522/35; 428/1.1; 428/1.2; 428/1.25; 428/1.26; 428/411.1; 428/472; 428/64.4; 528/170; 528/310; 528/350; 528/353; 528/272; 528/373; 528/391; 525/437; 525/444

(58) Field of Classification Search ............... 528/170, 528/310, 350, 353, 272, 373, 391; 522/162, 522/161, 167, 168, 169, 170, 172, 173, 174, 522/175, 176, 178, 179, 180, 181, 182, 904, 522/35; 428/1.1, 1.2, 1.25, 1.26, 411.1, 472.5, 428/64.4; 525/437, 444

See application file for complete search history.

(56) References Cited

U.S. PATENT DOCUMENTS

| | | | |
|---|---|---|---|
| 6,340,506 B1 * | 1/2002 | Buchecker et al. | 428/1.26 |
| 6,649,230 B1 * | 11/2003 | Seiberle et al. | 428/1.2 |
| 6,831,148 B2 * | 12/2004 | Buchecker et al. | 528/310 |
| 7,034,098 B2 * | 4/2006 | Marck et al. | 528/170 |

FOREIGN PATENT DOCUMENTS

| | | |
|---|---|---|
| EP | 0 611 786 A1 | 8/1994 |
| WO | WO 96/10049 A1 | 4/1996 |

OTHER PUBLICATIONS

F. Vogtle. Functional dendrimers. Progresses in Polymer Science, 25 (2000) 987-1041.*
Wang et al. Cinnamoyl Shell-Modified Poly(amidoamine) dendrimers. Journal of Polymer Science. Part A, Polymer Chemistry. vol. 38, (2000) 4147-4153.*
Vogtle et al. Photochemical and photophysical properties of poly(propylene amine) dendrimers with peripheral naphthalene and azobenzene groups. Photochemical and Photobiological Science, (2002), vol. 1, 45-51.*
Archut et al. Toward Photoswitchable dendritic Host. Interactions between azobenzene-functionalized dendrimers and eosin. Journal of American Chemical Society. (1998), 120, 12187-12191.*
Zhang et al. Photoactive Cascade Molecules: Polyether Dendrimers Bearing Spironaphthoxazine Groups on Their Peripheries. Macrocmolecular Chemistry and Physics. 2001, 202, No. 9.*

* cited by examiner

*Primary Examiner*—Sanza L McClendon
(74) *Attorney, Agent, or Firm*—Sughrue Mion, PLLC

(57) ABSTRACT

Photoreactive dendrimers comprising a core portion, branching units and terminal groups, wherein at least one terminal group and/or branching unit is a photoreactive group and wherein the photo reactive groups include preferably cinnamates, coumarins, benzylidenephthalimidines, benzylideneacetophenones, diphenylacetylenes stilbazoles, uracyl, quinolinone, maleinimides, or cinnamylidene acetic acid derivatives and are able to undergo photocyclization, in particular [2+2]-photocyclization.

43 Claims, No Drawings

PHOTOACTIVE MATERIALS

The present invention relates to the use of photoreactive dendrimers as orientation layers for liquid crystals and in the construction of unstructured and structured optical elements and multi-layer systems. Further, the present invention also relates to new photoreactive dendrimers.

The successful functioning of a liquid crystal device depends on the ability of the liquid crystal molecules within that device to adopt and maintain an imposed alignment. Alignment of the liquid crystal molecules is achieved by use of an orientation layer which defines a direction of orientation for the liquid crystal molecules of the device with the result that the longitudinal axes of the molecules become aligned with the direction of orientation defined by the orientation layer. In addition to this directional alignment, the orientation layer is also able to impart to the liquid crystal molecules an angle of tilt so that the molecules align themselves at an angle to the surface of the orientation layer rather than lying parallel hereto.

Tilt angles from 1° to 15° are usual for nematic liquid crystal displays (LCDs). Some electro-optical effects used for LCDs however require alignment layers with very high pretilt angles. Vertically aligned nematic (VAN) LCDs for instance require pretilt angles between 85° and 90°, measured from the surface plane. In the case of hybrid aligned nematic (HAN) LCDs, the pretilt angle at one of the substrates has to be in the above range, whereas the tilt angle at the other substrate is low (typically 0° to 10°).

Methods of preparing orientation layers for liquid crystal materials are well known to a skilled person. Customarily used uniaxially rubbed polymer orientation layers such as, for example, polyimides however impact a series of disadvantages like dust generation during the rubbing process and destruction of thin film transistors. Furthermore, the rubbing process does not allow the production of structured layers.

Orientation layers in which the direction of orientation can be predetermined by irradiation with polarized light have been known for some time. It is by that means possible to avoid the problems inherent to the rubbing process. In addition, it is possible to provide areas having different orientation and thus to structure the orientation layer as described for example in Jpn. J. Appl. Phys., 31 (1992), 2155-2164 (Schadt et al.). In that process the dimerisation of polymer-bonded photoactive cinnamic acid groups induced by irradiation with linearly polarized light is employed leading to an anisotropic polymer network. Those photo-oriented polymer networks can be used wherever structured or unstructured liquid crystal orientation layers are required.

In addition to their use in LCDs, such orientation layers can also be used, for example, in the production of so-called hybrid layers, as exemplified for instance in U.S. Pat. No. 5,602,661, European patent application EP-A-0689084 (both F. Hoffmann-La Roche AG) and WO-A-98/52077 (Rolic AG). Using those hybrid layers of photostructurable orientation polymers and crosslinkable low molecular weight liquid crystals, it is possible to realize optical elements such as, for example, non-absorptive color filters, linear and circular polarizers, optical delay layers and so on.

For instance EP-A-0611786 and WO-A-96/10049 (both F. Hoffmann-La Roche AG), as well as EP-A-0763552 (Rolic AG), describe cinnamic acid polymers that are suitable in principle for the synthesis of such anisotropically crosslinked, photostructured orientation layers for liquid crystals. In the case of the compounds described in EP-A-0763552 and WO-A-96/10049, on irradiation with linearly polarized light it is possible to induce, in addition to the desired orientation, simultaneously an angle of tilt. This allows the production of layers having structuring in respect of surface orientation and angle of tilt.

Photoactive materials for orientation layers were also described in WO-A-99/49360 (Rolic AG), JP-A-10-195296, JP-A-10-232400 (both Sarnsung Electron Devices Co., Ltd.), WO-A-99/15576 (Rolic AG) and WO-A-99/51662 (Kanegafuchi Kagaku Kogyo KK). In WO-A-99/15576 and WO-A-99/51662 polyimides incorporating photoactive cinnamate groups in their side chains are described. In WO-A-99/49360, JP-A-10-195296 and JP-A-10-232400 blends of polymeric compounds containing photoactive polymers on the one hand, and polyimides on the other hand are proposed. A disadvantage of such blends is their limited miscibility. Low contents of photoactive polymers however lead to a loss of orienting properties and consequently to a reduced contrast ratio of liquid crystal layers to be oriented whereas a reduced polyimide content results in insufficient holding ratios.

Recently, mixtures of liquid crystal monomers having cross-linkable groups and photo-orientable monomeric, oligomeric or polymeric compounds were described in WO-99/64924. Layers of such mixtures can be photoaligned by linearly polarized light and subsequently, or simultaneously, cross-linked. As a consequence, only a single layer is necessary to prepare a variety of coatings such as optical retarders, polarizing interference filters, structured polarizers as well as aligning layers for liquid crystals.

The use of photo-orientable polymeric compounds in such mixtures leads to a good alignment. A disadvantage of such mixtures is the often limited miscibility between the polymers and liquid crystal monomers, which bears the risk of a limited thermal stability, mainly due to a phase separation upon annealing at high temperatures. On the other hand, known photo-orientable materials of low molecular weight usually having good miscibility show poor alignment.

Generally, the ability of the resulting orientation layers to perform their function depends, in part, on the number of molecules in the layer that have been isomerised and/or dimerised as a result of irradiation with linearly polarized light. The extent to which the molecules are isomerised and/or dimerised depends in turn on the irradiation time, the irradiation energy and the structure of the molecules being irradiated.

However, a problem with low molecular weight materials used in the preparation of photo-oriented orientation layers is that either a crosslinking prior to irradiation and/or relatively long irradiation times are required to make efficient isomerisation and/or dimerisation of the component molecules. In general, when photo-orientable low molecular weight materials are mixed with liquid crystalline monomers, the possibility to find photo-active groups in register that can be isomerised and/or dimerised decreases. Consequently, there is a need for stable photoalignable materials with short irradiation time, good miscibility and good processability.

The inventors have now found that photoreactive dendrimers address that need. Photoreactive dendrimers can be used to produce orientation layers for liquid crystals and in the construction of unstructured and structured optical elements and multi-layer systems. In a second aspect, the invention provides new photoreactive dendrimers of good processability that, when irradiated over a relatively short time with polarized light, result in stable, high-resolution patternable orientation layers which also may induce an angle of tilt.

These molecules have better miscibility with low molecular weight materials such as liquid crystalline monomers (LCPs), as well as with polymers. Furthermore, cross-linkable or non cross-linkable low molecular weight molecules with specific functional groups, such as acrylates, silanes, etc., can be easily incorporated into the mixtures, or chemically linked to the dendrimers, in order to control physical properties such as pretilt, and to enhance the adhesion and wetting as well as long term mechanical, thermal and light stability.

The architecture of dendrimers is for instance described in *Advances in polymer science, Vol.* 142 (1999). Examples are shown in FIG. 1.

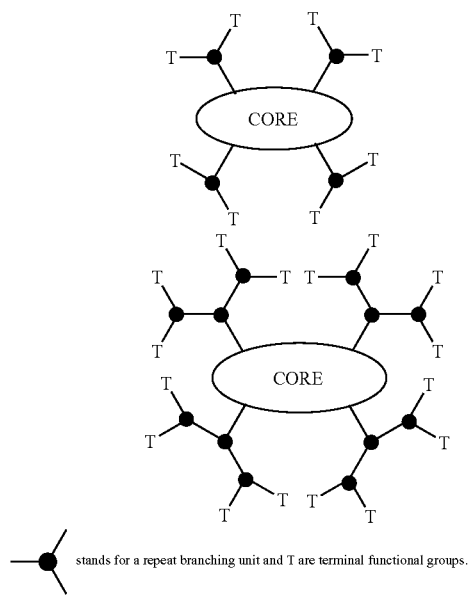

FIG. 1

—● stands for a repeat branching unit and T are terminal functional groups.

Dendrimers as used in the present invention have a core portion, branches and terminal portions. The first branching unit linked to the core portion is called the first generation of the dendrimer. The next branching unit linked to first generation, is called the second generation, etc. The last generation to which the terminal groups are linked is called the outermost generation of the dendrimer.

Preferably, at least one terminal group and/or branching unit is a photoreactive group.

Preferably, the photoreactive groups are able to undergo photocyclization, in particular [2+2]-photocyclization.

Preferably, the photoreactive groups are sensitive to UV or laser light, in particular linearly polarized UV light.

Preferred photoreactive groups are cinnamates, coumarins, benzylidenephthalimidines, benzylideneacetophenones, diphenylacetylenes stilbazoles, uracyl, quinolinone, maleinimides, or cinnamylidene acetic acid derivatives, particularly preferred groups are cinnamates, coumarins, benzylideneacetophenones, or maleimides.

Most preferred photoreactive groups are cinnamates or coumarins, in particular photoreactive groups represented by the general formulae Ia and Ib:

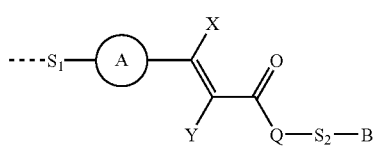

Ia

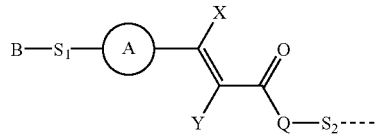

Ib wherein the broken line indicates the point of linkage to the outermost generation of the dendrimer and A represents pyrimidine-2,5-diyl, pyridine-2,5-diyl, 2,5-thiophenylene, 2,5-furanylene, 1,4- or 2,6-naphthylene; or phenylene, which is unsubstituted or mono- or poly-substituted by fluorine, chlorine or by a cyclic, straight-chain or branched alkyl residue which is unsubstituted mono- or poly-substituted by fluorine, chlorine, having 1 to 18 carbon atoms, wherein one or more non-adjacent —$CH_2$— groups may independently be replaced by a group C; wherein C represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —Si($CH_3$)$_2$—O—Si($CH_3$)$_2$—, wherein $R^1$ represents a hydrogen atom or lower alkyl;

B represents a hydrogen atom, or a group which is able to react or interact with a second material like polymers, oligomers, monomers, photoactive polymers, photoactive oligomers and/or photoactive monomers or surfaces;

$S_1$ and $S_2$ each independently of the other represent a single bond or a spacer unit such as a straight-chain or branched alkylene group which is unsubstituted, mono or poly-substituted by fluorine, chlorine, having 1 to 40 carbon atoms, wherein one or more non-adjacent —$CH_2$— groups may independently be replaced by a group D, with the proviso that oxygen atoms are not directly attached to each other; wherein D represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —Si($CH_3$)$_2$—O—Si($CH_3$)$_2$—, an aromatic or an alicyclic group, wherein $R^1$ represents a hydrogen atom or lower alkyl;

Q represents an oxygen atom or —$NR^1$— wherein $R^1$ represents a hydrogen atom or lower alkyl; and X, Y each independently of the other represents hydrogen, fluorine, chlorine, cyano, alkyl optionally substituted by fluorine having 1 to 12 carbon atoms in which optionally one or more non-adjacent alkyl —$CH_2$— groups are replaced by —O—, —CO—O—, —O—CO— and/or —CH=CH—.

It is preferred that the group A is selected from pyrimidine-2,5-diyl, pyridine-2,5-diyl, 2,5-thiophenylene, 2,5-furanylene, 1,4- or 2,6-naphthylene and phenylene, which is unsubstituted or substituted by a cyclic, straight-chain or branched alkyl residue which is unsubstituted, mono- or poly-substituted by fluorine, chlorine having from 1 to 12 carbon atoms in which optionally one or more non-adjacent alkyl —$CH_2$— groups are replaced by —O—, —CO—, —CO—O—, —O—CO—, —CH=CH— and C≡C—.

It is especially preferred that A is selected from 2,5-furanylene, 1,4- or 2,6-naphthylene and phenylene, which is unsubstituted or substituted by a cyclic, straight-chain or branched alkyl residue having 1 to 12 carbon atoms in which optionally one or more non-adjacent alkyl —$CH_2$— groups are replaced by —O—, —CO—, —CO—O—, —O—CO—, —CH=H— and —C≡C—.

By the term "phenylene" it should be understood to include 1,2-, 1,3- or 1,4-phenylene, which is optionally substituted. It is preferred that the phenylene group is either a 1,3- or a 1,4-phenylene. 1,4-phenylene groups are especially preferred.

By the term "group which is able to react or interact with a second material" it should be understood to include groups like radically or cationically polymerizable groups; hydrophilic anionic groups like groups consisting of —$OSO_2O^-$, —$SO_2O^-$, —$CO_2^-$, (—$O)_2P(O)O^-$, —$P(O)(O^-)_2$, —$OP(O)(O^-)_2$, —$P(O^-)_2$ and —$OP(O^-)_2$ in protonated or salt form e.g. as alkali metals salts or ammonium salts; polar groups like alcohol, thiol and isocyanate; and also mono-di-tri-alkoxy or halogeno silanes.

It is preferred that the group B is selected from hydrogen atom, radically or canonically polymerizable groups or also mono-, di-, tri-alkoxy or halogeno silanes.

It is more preferred that B is selected form hydrogen atom or radically or cationically polymerizable groups.

It is especially preferred that B is hydrogen.

Preferred groups Q are oxygen atom or —NH—.

It is especially preferred that Q is an oxygen atom.

It is preferred that the groups X and Y represent hydrogen.

Preferred photoactive groups are groups of formula Ia.

It is preferred that the group $S_1$ is selected from a single covalent bond, —O—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and a straight-chain or branched alkylene group, which is optionally substituted by one or more groups selected from fluorine, chlorine and cyano and in which two or three non-adjacent alkylene —$CH_2$— groups are independently optionally replaced by a group D with the proviso that the total number of chain carbon atoms in the alkylene group does not exceed 24, wherein $R^1$ represents a hydrogen atom or lower alkyl.

It is more preferred that $S_1$ is selected from a single covalent bond, —CO—O—, —O—CO—, —$(CH_2)_r$—, —$(CH_2)_r$—O—, —$(CH_2)_r$—CO—, —$(CH_2)_r$—CO—O—, —$(CH_2)_r$—O—CO—, —$(CH_2)_r$—CO—$NR^1$—, —$(CH_2)_r$—$NR^1$—CO—, —$(CH_2)_r$—$NR^1$—, —O—$(CH_2)_r$, —CO—O—$(CH_2)_r$, —O—CO—$(CH_2)_r$, —$NR^1$—CO—$(CH_2)_r$, —CO—$NR^1$—$(CH_2)_r$, —$NR^1$—$(CH_2)_r$, —O—$(CH_2)_r$—CO—O—, —O—$(CH_2)_r$—O—CO—, —O—$(CH_2)_r$—CO—$NR^1$—, —O—$(CH_2)_r$—$NR^1$—, —O—$(CH_2)_r$—O—, —O—$(CH_2)_r$—$NR^1$—CO—, —$NR^1$—$(CH_2)_r$—CO—O—, —$NR^1$—$(CH_2)_r$—O—, —$NR^1$—$(CH_2)_r$—$NR^1$—, —$NR^1$—$(CH_2)_r$—O—CO—, —CO—$NR^1$—$(CH_2)_r$—O—, —CO—$NR^1$—$(CH_2)_r$—$NR^1$—, —CO—$NR^1$—$(CH_2)_r$—O—CO—, —O—CO—$(CH_2)_r$—CO—, —O—CO—$(CH_2)_r$—O—, —O—CO—$(CH_2)_r$—$NR^2$—, —O—CO—$(CH_2)_r$—CO—O—, —O—CO—$(CH_2)_r$—CO—$NR^1$—, —O—CO—$(CH_2)_r$—$NR^1$—CO—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^1$—CO—$(CH_2)_s$—, —$(CH_2)_r$—$NR^1$—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—$NR^1$—CO—$(CH_2)_s$—O—, —$(CH_2)_r$—$NR^1$—CO—O—$(CH_2)_s$—O—, —O—$(CH_2)_r$—O—$(CH_2)_s$—, —O—$(CH_2)_r$—CO—O—$(CH_2)_s$—, —O—$(CH_2)_r$—$NR^1$—CO—$(CH_2)_s$—, —O—$(CH_2)_r$—$NR^1$—CO—O—$(CH_2)_s$—, —O—$(CH_2)_r$—O—$(CH_2)_s$—O—, —O—$(CH_2)_r$—$NR^1$—CO—O—$(CH_2)_s$—O—, and —O—CO—$(CH_2)_r$—O—$(CH_2)_s$—O—, wherein $R^1$ is as defined above, r and s each represent an integer from 1 to 20, preferably from 1 to 12, and r+s≦21, preferably ≦15.

By the terms —$(CH_2)_r$— and —$(CH_2)_s$— it should be understood to include straight-chain or branched alkylene groupings containing r or s carbon atoms respectively.

It is especially preferred that $S_1$ is selected from a single covalent bond, —$(CH_2)_r$—, —$(CH_2)_r$—O—, —$(CH_2)_r$—CO—O—, —$(CH_2)_r$—O—CO—, —$(CH_2)_r$—CO—NH—, —$(CH_2)_r$—NH—CO—, —O—$(CH_2)_r$, —CO—O—$(CH_2)_r$, —CO—NH—$(CH_2)_r$, —O—CO—$(CH_2)_r$, —O—CO—$(CH_2)_r$—CO—O—, —O—$(CH_2)_r$—O—CO—, —O$(CH_2)_r$—CO—NH—, —O—$(CH_2)_r$—NH—CO—, —CO—O—$(CH_2)_r$—O—, —CO—NH—$(CH_2)_r$—O—, —O—$(CH_2)_r$—O—, —$(CH_2)_r$—NH—CO—$(CH_2)_s$—, —$(CH_2)_r$—NH—CO—O—$(CH_2)_s$—, —$(CH_2)_r$—O—$(CH_2)_s$—O—, —$(CH_2)_r$—NH—CO—$(CH_2)_s$—O—, —$(CH_2)_r$—NHCO—O—$(CH_2)_s$—O—, —O—$(CH_2)_r$—NH—CO—$(CH_2)_s$—, —O—$(CH_2)_r$—O—$(CH_2)_s$—O—, —O—CO—$(CH_2)_r$—O—$(CH_2)_s$—O—, —CO—O—$(CH_2)_r$—O—$(CH_2)_s$—O—, —O—$(CH_2)_r$—NH—CO—$(CH_2)_s$—O— and —O—CO—$(CH_2)_r$—NH—CO—$(CH_2)_s$—O—, wherein r and s each represent an integer from 1 to 12 and r+s≦15.

Examples of preferred groups $S_1$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-6-otylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyloxy, 1-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

It is preferred that the group $S_2$ is selected from a single covalent bond, a straight-chain or branched alkylene group, which is optionally substituted by one or more groups selected from fluorine, chlorine and cyano and in which two or three non-adjacent alkylene —$CH_2$— groups are independently optionally replaced by a group D with the proviso that the total number of chain carbon atoms in the alkylene group does not exceed 24, wherein $R^1$ represents a hydrogen atom or lower alkyl.

It is especially preferred that $S_2$ is selected from a single covalent bond, $—(CH_2)_r—$, $—(CH_2)_r—O—$, $—(CH_2)_r—CO—$, $—(CH_2)_r—CO—O—$, $—(CH_2)_r—O—CO—$, $—(CH_2)_r—CO—NR^1—$ $(CH_2)_r—NR^1—CO—$, $—(CH_2)_r—NR^1—$, $—(CH_2)_r—O—(CH_2)_s—$, $—(CH_2)_r—CO—O—(CH_2)_s—$, $—(CH_2)_r—O—CO—(CH_2)_s—$, $—(CH_2)_r—NR^1—CO—(CH_2)_s—$, $—(CH_2)_r—NR^1—CO—O—(CH_2)_s—$, $—(CH_2)_r—O—(CH_2)_s—O—$, $—(CH_2)_r—CO—O—(CH_2)_s—O—$, $—(CH_2)_r—O—CO—(CH_2)_s—O—$, $—(CH_2)_r—NR^1—CO—(CH_2)_s—O—$, $—(CH_2)_r—NR^1—CO—O—(CH_2)_s—O—$, $—(CH_2)_r(CH_2)_s—CO—O—$ and $—(CH_2)_r—O—(CH_2)_s—O—CO—$, wherein $R^1$ is as defined herein above; r and s each represent an integer from 1 to 20; and $r+s \leq 21$. It is more preferred that r and s each represent an integer from 1 to 12. It is especially preferred that $r+s \leq 15$.

Examples of preferred groups $S_2$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexylene, 6-(3-propyleneiminocarbonyl)hexyloxy and the like.

By the term "aromatic" it should be understood to include optionally substituted carbocylic and heterocyclic groups incorporating five, six or ten ring atoms like furan, phenyl, pyridine, pyrimidine, naphthalene, or tetraline units.

By the term "cyclic, straight-chain or branched alkyl residue which is unsubstituted, mono-substituted by cyano or fluorine, chlorine, or poly-substituted by fluorine, chlorine, having 1 to 18 carbon atoms, wherein one or more non-adjacent-$CH_2$— groups may independently be replaced by a group C," it should be understood to include groups selected from the group comprising methyl, ethyl, propyl, isopropyl, butyl, isobutyl, sec-butyl, tert-butyl, pentyl, isopentyl, cyclopentyl, hexyl, cyclohexyl, heptyl, octyl, nonyl, decyl, undecyl, dodecyl, 3-methylpentyl, allyl, but-3-en-1-yl, pent-4-en-1-yl, hex-5-en-1-yl, propynyl, butynyl, pentynyl, methoxy, ethoxy, propoxy, isopropoxy, butoxy, isobutoxy, sec-butoxy, tert-butoxy, pentyloxy, isopentyloxy, cyclopentyloxy, hexyloxy, cyclohexyloxy, heptyloxy, octyloxy, nonyloxy, decyloxy, undecyloxy, dodecyloxy, 3-methylpentyloxy, allyloxy, but-3-enyloxy, pent-4-enyloxy, cylohexylmethoxy, cyclopentylmethoxy, methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, cyclopentyloxycarbonyl, hexyloxycarbonyl, cyclohexyloxycarbonyl, octyloxycarbonyl, nonyloxycarbonyl, decyloxycarbonyl, undecyloxycarbonyl, dodecyloxycarbonyl, 3-methylpentyloxycarbonyl, allyloxycarbonyl, but-3-enyloxycarbonyl, pent-4-enyloxycarbonyl, cylohexylmethoxycarbonyl, cyclopentylmethoxycarbonyl, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, cyclopentylcarbonyloxy, 4-[3,4,5-tris(octyloxy)benzyl]oxy, hexylcarbonyloxy, cyclohexylcarbonyloxy, (4-propylcyclohexyl)methoxy, (4-propylcyclohexyl)carbonyloxy, (4-pentylbenzoyl)oxy, octylcarbonyloxy, nonylcarbonyloxy, decylcarbonyloxy, undecylcarbonyloxy, dodecyl-carbonyloxy, 3-methylpentylcarbonyloxy, but-3-enyloxy, pent-4-enyloxy, acetyl, ethyl-carbonyl, propylcarbonyl, isopropylcarbonyl, butylcarbonyl, isobutylcarbonyl, sec-butylcarbonyl, pentylcarbonyl, isopentylcarbonyl, cyclohexylcarbonyl, octyl-carbonyl, nonylcarbonyl, decylcarbonyl, undecylcarbonyl, dodecylcarbonyl, methoxyacetoxy, 1-methoxy-2-propoxy, 3-methoxy-1-propoxy, 2-methoxyethoxy, 2-isopropoxyethoxy, 1-ethoxy-3-pentyloxy, 3-butynyloxy, 4-pentynyloxy, 5-chloropentynyl, 4-pentynecarbonyloxy, 6-propyloxyhexyl, 6-propyloxyhexyloxy, 2-fluoroethyl, trifluoromethyl, 2,2,2-trifluoroethyl, 1H,1H-pentadecafluorooctyl, 1H,1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl, 1-fluoropropoxy, 1-fluoropentyloxy, 2-fluoropropoxy, 2,2-difluoropropoxy, 3-fluoropropoxy, 3,3-difluoropropoxy, 3,3,3-trifluoropropoxy, trifluoromethoxy and the like.

By the term "straight-chain or branched alkylene residue which is unsubstituted, mono-substituted by cyano or fluorine, chlorine, or poly-substituted by fluorine, chlorine, having 1 to 40 carbon atoms, wherein one or more non-adjacent —$CH_2$— groups may independently be replaced by a group D," it should be understood to include groups selected from the group comprising 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy, 2-{4-[4-(2-oxy-ethyl)cyclohexyl]phenyl}ethoxy, 2-[4'-(4-oxybutyl)-1,1'biphenyl-4-yl]ethoxy, 2-{4-[4-(2-oxy-ethyl)phenyl}ethoxy, 2-{4-[4-(2-carbonyloxyethyl)cyclohexyl]phenyl}-ethoxy, 2-[4'-(4-carbonyloxybutyl)-1,1'biphenylene-4-yl]ethoxy, 6-{4-[4-(2-carbonyloxyethyl)phenyl}hexyloxy, 5-{[4'-(4-oxybutoxy)-1,1'-biphenyl-4-yl]oxy}pentylcarbonyloxy, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)-heptylene, 8-(carbonyloxy)octylene, 9-(carbonyloxy)nonylene, 10-(carbonyloxy)-decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl) hexylene and the like.

By the term "lower alkyl" it should be understood to include straight chain and branched hydrocarbon radicals having from 1 to 6 carbon atoms, preferably from 1 to 3 carbon atoms. Methyl, ethyl, propyl and isopropyl groups are especially preferred.

By the term "alicyclic" it should be understood to include non-aromatic carbocyclic or heterocyclic ring systems with 3 to 10 carbon atoms like cyclopropane, cyclobutane, cyclopentane, cyclopentene, cyclohexane, cyclohexene, cyclohexadiene and decaline.

By the term "radically or cationically polymerizable group" it should be understood to include preferably acrylate, methacrylate, 2-chloroacrylate, 2 phenylacrylate; N-lower alkyl substituted acrylamide, methacrylamide, 2-chloroacrylamide and 2-phenacrylamide; vinyl ether, vinyl ester, styrene derivative; maleic acid derivative; fumaric acid derivative; cinnamate derivative and epoxy derivative and the like. Preferred groups are acrylate, methacrylate; N-lower alkyl substituted acrylamide, vinyl ether, vinyl ester, styrene derivative; maleic acid derivative and cinnamate derivative. Most preferred groups are acrylate, methacrylate, vinyl ether and cinnamate derivative.

The terminal moieties can also be hydrogen; or a group like group B which is able to react or interact with a second material like polymers, oligomers, monomers, photoactive polymers, photoactive oligomers and/or photoactive monomers or surfaces; or an unit such as a straight-chain or branched alkyl group which is unsubstituted, mono or poly-substituted by fluorine, chlorine, cyano, having 1 to 24 carbon atoms, wherein one or more —$CH_2$— groups may independently be replaced by a group D, with the proviso that oxygen atoms are not directly attached to each other.

Preferred is that at least four terminal moieties are photoactive groups.

The repeating branching units refers to a constituent portion connecting one core portion or a branching portion to a adjacent branching portion or an adjacent terminal portion. The structure of the repeat branching units is not specially limited. Each repeat branching unit of a dendrimer are not necessarily the same. Further, the number of branching units per dendrimer use in the present invention is at least 3 i.e. four terminal groups and containing at least four photoreactive groups.

Preferred branching units are represented by dendritic blocks of the general formulae IIa, IIb or a combination of them, for example formula IIc:

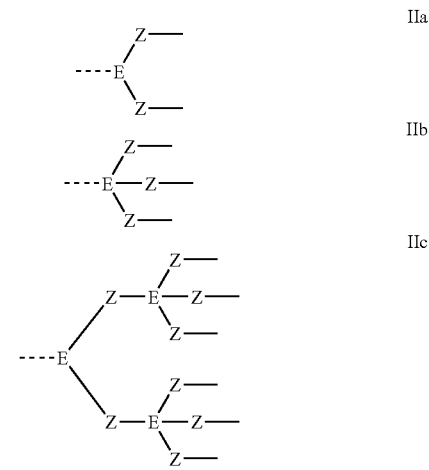

wherein
the broken line indicates the point of linkage to the core portion or to the Z units of the previous generation of branching units; and
the full line indicates the point of linkage to the E residue of the next generation of branching units or the point of linkage to the terminal groups; and wherein E represents an organic residue;

Z represents a single bond or a spacer unit such as a straight-chain or branched alkylene group which is unsubstituted, mono or poly-substituted by fluorine, chlorine, having 1 to 24 carbon atoms, wherein one or more —$CH_2$— groups may independently be replaced by a group D, with the proviso that oxygen atoms are not directly attached to each other, or Z may also represent a photoreactive group like groups represented by general formula Ia and Ib wherein B in this case indicates the point of linkage to E and wherein A, $S_1$, $S_2$, Q, X and Y are as defined above.

Especially preferred branching units are groups of formula IIa and groups of formula IIc, while groups of formula IIb, if present, are favorably located in the outermost generation.

Most preferred dendritic blocks are groups of formulae Ia.

It is also preferred that the groups E are aromatic, alicyclic or $CR^1$— units wherein $R^1$ has the meaning defined above.

It is especially preferred that the groups E are selected form 1,2,3-benzenetriyl, 1,3,4-benzenetriyl, 1,3,5-benzenetriyl or a group $CR^1$—.

It is preferred that the group Z is selected from a single covalent bond, —O—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and a straight-chain or branched alkylene group, which is optionally substituted by one or more groups selected from fluorine, chlorine and cyano and in which one up to four non-adjacent alkylene —$CH_2$— groups are independently optionally replaced by a group D with the proviso that the total number of chain carbon atoms in the alkylene group does not exceed 30 and wherein $R^1$ represents a hydrogen atom or lower alkyl.

It is also preferred that Z represents photoreactive groups like groups represented by general formula Ia and Ib wherein B in this case indicates the point of linkage to E and wherein A, $S_1$, $S_2$, Q, X and Y are as defined above.

Examples for preferred groups Z include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 1-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy, 2-{4-[4-(2-oxy-ethyl)cyclohexyl]phenyl}ethoxy, 2-[4'-(4-oxybutyl)-1,1'biphenyl-4-yl]ethoxy, 2-{4-[4-(2-oxy-ethyl)phenyl}ethoxy, 2-{4-[4-(2-carbonyloxyethyl)cyclohexyl]phenyl}-ethoxy, 2-[4'-(4-carbonyloxybutyl)-1,1'biphenylene-4-yl]ethoxy, 6-{4-[4-(2-carbonyloxyethyl)phenyl}hexyloxy, 5-{[4'-(4-oxybutoxy)-1,1'-biphenyl-4-yl]oxy}pentylcarbonyloxy, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)-heptylene, 8-(carbonyloxy)octylene, 9-(carbonyloxy)nonylene, 10-(carbonyloxy)-decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene, 6-oxyhexyl(2E)-3-[4-(4-oxybutoxy)-3-methoxyphenyl]-2-propenoate, 8-oxyoctyl(2E)-3-[4-(5-oxypentoxy)phenyl]-2-propenoate, 6-oxyhexyl(2E)-3-[4-(4-(carbonyloxy)butoxy)-3-methoxyphenyl]-2-propenoate, 8-(oxycarbonyl)octyl(2E)-3-[4-(5-oxypentoxy)phenyl]-2-propenoate and the like.

The core portions (FIG. 1) of the present invention are not limited. They can be covalently bonded to one, two, three or four dendritic units. Preferred core units are represented by formulae IIIa, IIIb, IIIc, IIId and IIIe:

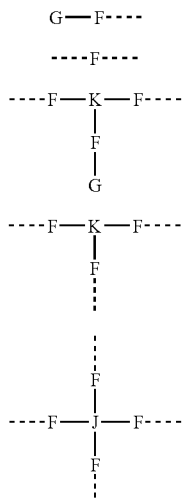

IIIa
IIIb
IIIc
IIId
IIIe wherein the broken line indicates the point of linkage with a branching unit and wherein F represents a single bond or a unit such as a straight-chain or branched alkylene group which is unsubstituted, mono or poly-substituted by fluorine, chlorine, having 1 to 40 carbon atoms, wherein one or more —$CH_2$— groups may independently be replaced by a group D, with the proviso that oxygen atoms are not directly attached to each other, or F represents a photoreactive group like groups represented by general formula Ia and Ib wherein B in this case indicates the point of linkage to the first generation of the dendrimer;

G represents a hydrogen atom; a group which is able to react or interact with a second material like polymers, oligomers, monomers, photoactive polymers, photoactive oligomers and/or photoactive monomers or surfaces; or a monomer repeating unit in a homo or copolymer from a radical or cationic polymerisation;

K represents a nitrogen atom, a carbon atom, a group $CR^1$— or an aromatic or alicyclic group, which is optionally substituted by a group selected from fluorine, chlorine, cyano and a $C_{1-18}$ cyclic, straight-chain or branched alkyl group, which is optionally substituted by a single cyano group or by one or more halogen atoms and in which one or more non-adjacent alkyl —$CH_2$— groups are optionally replaced by a group selected from —O—, —CO—, —CO—O—, —O—CO—, —Si($CH_3$)$_2$—O—Si($CH_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C— and —O—CO—O—, wherein $R^1$ represents a hydrogen atom or lower alkyl; and J represents a carbon atom or an aromatic or alicyclic group, which is optionally substituted by a group selected from fluorine, chlorine, cyano and a $C_{1-18}$ cyclic, straight-chain or branched alkyl group, which is optionally substituted by a single cyano group or by one or more halogen atoms and in which one or more non-adjacent alkyl —$CH_2$— groups are optionally replaced by a group selected from —O—, —CO—, —CO—O—, —O—CO—, —Si($CH_3$)$_2$—O—Si($CH_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C— and —O—CO—O—, wherein $R^1$ represents a hydrogen atom or lower alkyl.

By the term "a monomer repeating unit in a homo or copolymer from a radical or cationic polymerisation" it should be understood to include monomer repeating unit form the group acrylate, methacrylate, 2-chloroacrylate, 2 phenylacrylate; N-lower alkyl substituted acrylamide, methacrylamide, 2-chloroacrylamide and 2-phenacrylamide; vinyl ether, vinyl ester, styrene derivative; maleic acid derivative; fumaric acid derivative; cinnamate derivative and epoxy derivative and the like.

It is preferred that the group F is selected from a single covalent bond, —O—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and a straight-chain or branched alkylene group, which is optionally substituted by one or more groups selected from fluorine, chlorine and cyano and in which up to four non-adjacent alkylene —$CH_2$— groups are independently optionally replaced by a group D with the proviso that the total number of chain carbon atoms in the alkylene group does not exceed 30, wherein $R^1$ represents a hydrogen atom or lower alkyl.

It is also preferred that F represents photoreactive groups like a group represented by general formula Ia or Ib wherein B in this case indicates the point of linkage to the first dendron generation and wherein A, $S_1$, $S_2$, Q, X and Y areas defined above.

Example for preferred groups F include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy, 2-{4-[4-(2-oxy-ethyl)cyclohexyl]

phenyl}ethoxy, 2-[4'-(4-oxybutyl)-1,1'biphenyl-4-yl]ethoxy, 2-{4-[4-(2-oxy-ethyl)phenyl}ethoxy, 2-{4-[4-(2-carbonyloxyethyl)cyclohexyl]phenyl}-ethoxy, 2-[4'-(2-carbonyloxybutyl)-1,1'biphenylene-4-yl]ethoxy, 6-{4-[4-(2-carbonyloxyethyl)phenyl}hexyloxy, 5-{[4'-(4-oxybutoxy)-1,1'-biphenyl-4-yl]oxy}pentylcarbonyloxy, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)-heptylene, 8-(carbonyloxy)octylene, 9-(carbonyloxy)nonylene, 10-(carbonyloxy)-decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene, 6-oxyhexyl(2E)-3-[4-(4-oxybutoxy)-3-methoxyphenyl]-2-propenoate, 8-oxyoctyl(2E)-3-[4-(5-oxypentoxy)phenyl]-2-propenoate, 1,11-bis-[(2E)-3-(4-oxyphenyl)-2-propenoate]undecylene and the like It is preferred that the group G is selected from a hydrogen atom; a radically or cationically polymerizable group, or also from mono, -di or -tri-alkoxy or halogeno silanes.

It is more preferred that G is selected from a hydrogen atom, a radically or cationically polymerizable groups or a monomer unit in a homo or copolymer from a radical or cationic polymerisation.

It is especially preferred that G is a radically or cationically polymerizable groups as defined above.

It is also preferred that the group K is a nitrogen atom, a carbon atom, an aromatic, an alicyclic or a CR$^1$— unit wherein R$^1$ is as defined above.

It is especially preferred that the group K is selected form 1,2,3-benzenetriyl, 1,3,4-benzenetriyl, 1,3,5-benzenetriyl or a group CR$^1$—.

It is also preferred that the group J is a carbon atom, an aromatic or an alicyclic unit.

It is especially preferred that the group J is a carbon atom.

Preferred core portions are groups of formulae IIIa, IIIb, IIIc, IIId.

More preferred core portions are groups of formulae IIIa and IIIb.

Dendrimers used in the present invention may be prepared in accordance with known methods, such as those described in *Advances in polymer science*, Vol. 142 (1999).

Additives such as silane-containing compounds and epoxy-containing crosslinking agents may be added to the dendrimers of the invention in order to improve the adhesion of the dendrimer to a substrate. Suitable silane-containing compounds are described in *Plast. Eng.*, Vol. 36 (1996) (Polyimides, fundamentals and applications). Suitable epoxy-containing crosslinking agents include 4,4'-methylenebis-(N,N-diglycidylaniline), trimethylolpropane triglycidyl ether, benzene-1,2,4,5-tetra-carboxylic acid 1,2:4,5-N,N'-diglycidyldiimide, polyethylene glycol diglycidyl ether, N,N-diglycidylcyclohexylamine and the like.

Further additives such as a photosensitiser, a photoradical generator and/or a cationic photoinitiator may also be added to the dendrimers of the invention. Suitable photo-active additives include 2,2-dimethoxyphenylethanone, a mixture of diphenylmethanone and N,N-dimethylbenzenamine or ethyl 4-(dimethylamino)benzoate, xanthone, thioxanthone, IRGACURE™ 184, 369, 500, 651 and 907 (Ciba), Michler's ketone, triaryl sulfonium salts and the like.

The dendrimers according to the invention are used as orientation layers for the liquid crystals and in the construction of unstructured and structured optical elements and multi-layer systems. They may be used alone or in combination with polymers, oligomers, monomers, photoactive polymers, photoactive oligomers and/or photoactive monomers, depending upon the application to which the polymer layer is to be put. It will therefore be appreciated that by varying the composition of the polymer layer it is possible to control properties such as an induced pretilt angle, good surface wetting, high voltage holding ratio, a specific anchoring energy etc. One or more of the orientation layers of the present invention may be used in the construction of electrooptical components.

Suitable photoactive polymers or oligomers for combination with the dendrimers of the invention are described for example in EP-A-0611786, WO-A-96/10049, EP-A-0763552, U.S. Pat. No. 5,965,761, EP-A-0857728, EP-A-0860455 and WO-A-99/15576.

Suitable photoactive monomers are for example those described in U.S. Pat. Nos. 5,567,349, 5,650,534, 5,593,617, 5,851,427, 5,707,544, 5,851,424, 5,700,393, 5,800,733, WO-98/52905, WO-00/05189, WO-00/48985 and WO-00/55110.

The following non-limiting examples further describe the present invention. Variations on these falling within the scope of the invention will be apparent to a person skilled in the art.

EXAMPLES
Synthetic Example 1
Preparation of 1,6-hexandiol di[3,5-bis[(8-{2-methoxy-4-[(1E)-3-methoxy-3-oxo-1-propenyl]phenoxy}octyl)oxy]benzyloxy]benzoate
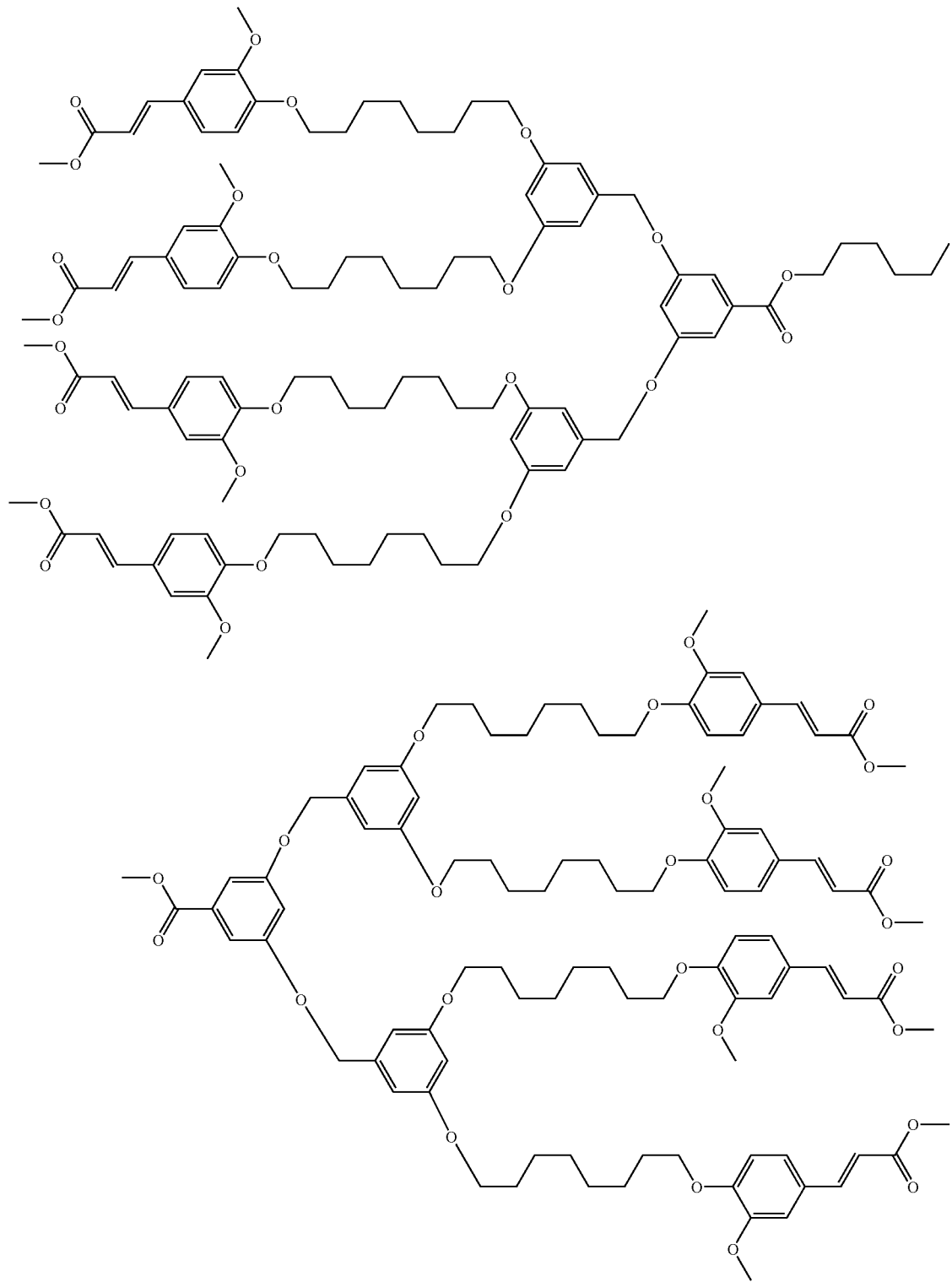

0.390 g (1.0 mmol) of 1,6-hexandiol di(3,5-dihydroxy) benzoate, 1.1 g (4.2 mmol) triphenylphosphine were dissolved in 5.4 ml tetrahydrofurane, 3.1 g (4.0 mmol) 3,5-bis[(8-{2-methoxy-4-[(1E)-3-methoxy-3-oxo-11-propenyl] phenoxy}octyl)oxy]benzyl alcohol and 10 ml tetrahydrofurane were added. 1.83 g (4.2 mmol) of a 40% solution of azodicarboxylic acid diethyl ester in toluene was added dropwise thereto over a period of 35 minutes. The mixture was subsequently allowed to react for 3.5 hours at 25° C. The reaction mixture was then partitioned between ethyl acetate and water. The organic phase was washed repeatedly with water, dried over sodium sulfate, filtered and concentrated by rotary evaporation. First chromatography of the residue on 240 g silica gel using toluene:ethyl acetate (9:1) as eluant and second chromatography on 100 g LiChroprep RP-18 using acetonitrile:tetrahydrofurane (85:15) as eluant yielded 1.58 g (46.0%) of 1,6-hexandiol di[3,5-bis[(8-{2-methoxy-4[(1E)-3-methoxy-3-oxo-1-propenyl] phenoxy}octyl)oxy]benzyloxy]benzoate ("Dendrimer I"). Tg=41.2° C.

The intermediates used as starting material were prepared in accordance with the following procedure.

Preparation of methyl(2E)-3-{4-[(8-chloroctyl)oxy]-3-methoxyphenyl}-2-propenoate 20.0 g (96.06 mmol) methyl(2E)-3-(4-hydroxy-3-methoxyphenyl)-2-propenoate, 16.6 g (100.9 mmol) 8-chlor-1-octanol and 27.7 g (105.7 mmol) of triphenylphosphine were dissolved in 400 ml of tetrahydrofurane. The colourless solution was subsequently cooled to 0° C. and 46.0 g (105.7 mmol) of a 40% solution of azodicarboxylic acid diethyl ester in toluene was added dropwise thereto over a period of 25 minutes. The mixture was subsequently allowed to react for 4 hours at 0° C. The reaction mixture reduced in volume by evaporation. The resulting residue was added to a mixture of methanol and water (3:2) and was then extracted with a mixture of tert.-butyl-methylether:hexane 1:1. The tert.-butyl-methylether:hexane phase was washed repeatedly with water, dried over magnesium sulfate, filtered and concentrated by rotary evaporation. The crude product was recrystallised from 2-propanol yielded 30.8 g (90%) methyl(2E)-3-{4-[(8-chloroctyl)oxy]-3-methoxyphenyl}-2-propenoate as white crystals.

Preparation of methyl(2E)-3-{4-[(8-iodoctyl)oxy]-3-methoxyphenyl}-2-propenoate 26.8 g (75.52 mmol) methyl(2E)-3-{4-[(S-chloroctyl) oxy]-3-methoxyphenyl}-2-propenoate was dissolved in 1000 ml acetone. 65.16 g (435.15 mmol) sodium iodide were added. The reaction suspension was heated at reflux temperature for 24 hours. The reaction mixture was partitioned between diethylether and water. The organic phase was washed repeatedly with water, dried over sodium sulfate, filtered and concentrated by rotary evaporation. The crude product was recrystallised from 2-propanol yielded 30.1 g (90%) methyl(2E)-3-{4-[(8-iodoctyl)oxy]-3-methoxyphenyl}-2-propenoate as white crystals.

Preparation of 3,5-bis[(8-{2-methoxy-4[(1E)-3-methoxy-3-oxo-1-propenyl]phenoxy}octyl)oxy]benzyl alcohol 5.87 g (13.15 mmol) methyl(2E)-3-{4-[(8-iodoctyl)oxy]-3-methoxyphenyl]-2-propenoate, 0.872 g (6.26 mmol) 3,5-dihydroxybenzyl alcohol were dissolved in 50 ml N,N-dimethylformamide. 4.33 g (31.31 mmol) potassium carbonate were added. The reaction suspension was then heated at reflux temperature for 24 hours. The reaction mixture was partitioned between ethyl acetate and a saturated sodium chloride solution. The organic phase was washed repeatedly with water, dried over sodium sulfate, filtered and concentrated by rotary evaporation. Chromatography of the residue on 240 g silica gel using first toluene: ethyl acetate (4:1)then (7:3) yielded 2.15 g (42%) 3,5-bis[(8-{2-methoxy-4-[(1E)-3-methoxy-3-oxo-1-propenyl]phenoxy}octyl)oxy]benzyl alcohol as colorless oil.

Preparation of 1,6-hexandiol bis-(3,5 dihydroxy)benzoate 4.85 g (31.5 mmol) 3,5-dinitrobenzoic acid was suspended in 31 ml Acetonitrile. 4.80 g (31.5 mmol) 1,8-diazabicyclo[5.4.0]undec-7-ene(1,5-5) (DBU) were added dropwise over a period of 10 minutes. 3.66 g (15.0 mmol) 1,6-dibromohexane were added and the resulting mixture was then heated to 84° C. for 18 hours. The reaction mixture was cooled and then partitioned between diethylether and water. The organic phase was washed repeatedly with water, dried over sodium sulfate, filtered and concentrated by rotary evaporation. Chromatography of the residue on 240 g silica gel using first toluene:ethyl acetate (4:1) then (1:1) as eluant yielded 3.39 g (53%) of 1,6-hexandiol bis-(3,5 dihydroxy)benzoate as beige crystals.

Synthetic Example 2

Preparation of 1,8-octandiol bis-[3,5-bis({-2,2-bis [({4-[(1E)-3-methoxy-3-oxo-1-propenyl] benzoyl}oxy)methyl]propanoyl}amino)]benzoate

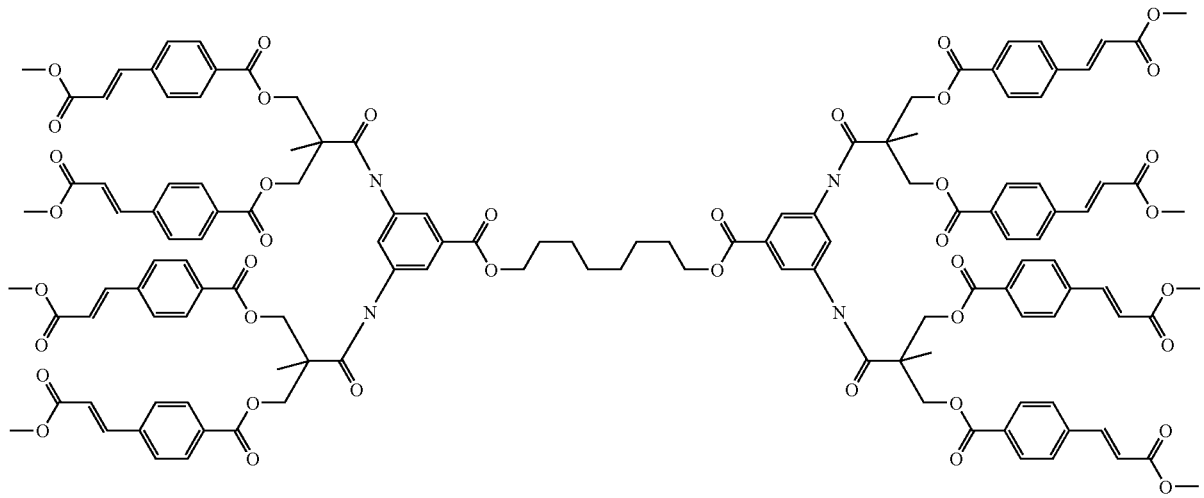

0.86 g (0.978 mmol) 1,8-octandiol bis(3,5-bis{[2,2,-bis (hydroxymethyl)propanoyl]amino}benzoate, 1.815 g (8.80 mmol) 4-[(1E)-3-methoxy-3-oxo-1-propenyl]benzoic acid, 0.29 g (0.978 mmol) 4-(dimethylamino)-pyridinium p-toluenesulfonate in 30 ml dichloromethane and 10 ml tetrahydrofurane was cooled to 0° C. and 1.73 g (8.37 mmol) N,N'-dicyclohexylcarbodiimide were added. The mixture was subsequently allowed to react for 48 hours at 25° C. and filtered. The filtrate was concentrated by evaporation. The crude product was first purified by chromatography on 150 g silica gel using toluene:ethyl acetate (7:3) as eluant then was reprecipitated form THF (20 ml) into 400 ml methanol to yield 1.86 g (80%) 1,8-octandiol bis-[3,5-bis({-2,2-bis[({4-[(1E)-3-methoxy-3-oxo-1-propenyl]benzoyl}oxy)methyl] propanoyl}amino)]benzoate ("Dendrimer 2") as white powder. Tg=83° C.

The intermediates used as starting material were prepared in accordance with the following procedure.

Preparation of 1,8-octandiol bis(3,5 diamino)benzoate 3.57 g (6.68 mmol) 1,8-octandiol bis-(3,5 dinitro)benzoate were dissolved in a mixture of 150 ml N,N-dimethylformamide and 17 ml water. 21.66 g (80.14 mmol) ferric chloride hexahydrate and 8.73 g (133.56 mmol) zinc powder were added, the temperature rise to 45° C. The mixture was allowed to react for 2 hours. The reaction mixture was then partitioned between ethyl acetate and water and filtered. The organic phase was washed repeatedly with water, dried over sodium sulfate, filtered and concentrated by rotary evaporation. The crude product was first recrystallised from a ethyl acetate:hexane 2:1 mixture and second form ethanol yielded 2.04 g (73%) of 1,8-octandiol bis(3,5 diamino)benzoate as beige crystals.

Preparation of 1,8-octandiol bis(3,5-bis{[(2,2,5-trimethyl-1,3-dioxan-5-yl)carbonyl}amino)benzoate A mixture of 0.946 g (5.43 mmol) 2,2,5-trimethyl-1,3-dioxane-5-carboxylic acid, 0.500 g (1.21 mmol) 1,8-octandiol bis(3,5 diamino)benzoate, 0.14 g (0.48 mmol) 4-(dimethylamino)pyridinium p-toluenesulfonate in 20 ml dichloromethane was cooled to 0° C. and 1.24 g (6.03 mmol) N,N'-dicyclohexylcarbodiimide were added. The mixture was subsequently allowed to react for 72 hours at 25° C. and filtered. The filtrate was concentrated by evaporation. Chromatography of the residue on 150 g silica gel using tert. butyl-methyl ether:ethyl acetate 3:1 as eluant yielded 1.10 g (87%) 1,8-octandiol bis(3,5-bis{[(2,2,5-trimethyl-1,3-dioxan-5-yl)carbonyl}amino)benzoate as white crystals.

Preparation of 1,8-octandiol bis(3,5-bis{[2,2,-bis (hydroxymethyl)propanoyl]amino}benzoate 1.10 g (1.06 mmol) 1,8-octandiol bis(3,5-bis{[(2,2,5-trimethyl-1,3-dioxa-5-yl)carbonyl}amino)benzoate was dissolved in 10 ml methanol and 10 ml tetrahydrofurane. 0.50 g of Dowex 50Wx2 resin and the reaction mixture was stirred for 4 hours at room temperature. The Dowex resin was filtered off and washed with tetrahydrofurane. The filtrate was concentrated by rotary evaporation yielded 0.86 g (92%) 1,8- octandiol bis(3,5-bis{[2,2,-bis(hydroxymethyl)propanoyl]amino}benzoate as yellowish crystals.

Synthetic Example 3

Preparation of 6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}hexyl methacrylate.

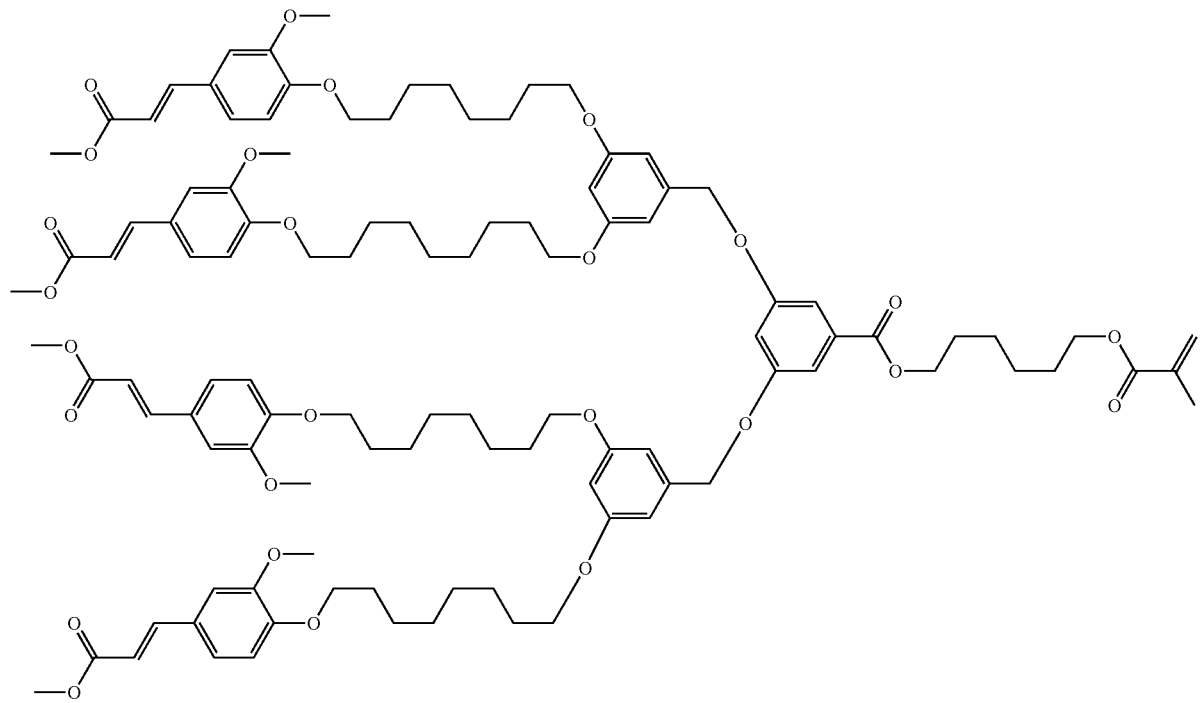

1.10 g (1.31 mmol) 3,5-bis[(8-{2-methoxy-4-[(1E)-3-methoxy-3-oxo-1-propenyl]phenoxy}octyl)oxy]benzyl bromide, 0.204 g (0.63 mmol) 6-(methacryloyloxy)hexyl 3,5-dihydroxybenzoate, 17 mg (0.06 mmol) 18-Crown-6 were dissolved in 20 ml 2-butanone. 0.114 g (0.82 mmol) potassium carbonate were added. The reaction suspension was then heated at reflux temperature for 24 hours. The reaction mixture was partitioned between ethyl acetate and water. The organic phase was washed repeatedly with water, dried over sodium sulfate, filtered and concentrated by rotary evaporation. Chromatography of the residue on 10 g LiChroprep RP-18 using first Acetonitrile then tetrahydrofurane) as eluant yielded 0.90 g (77%) 6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}hexyl methacrylate ("Dendrimer 3") as colorless oil.

The intermediates used as starting material were prepared in accordance with the following procedure.

Preparation of 3,5-bis[(8-{2-methoxy-4-[(1E)-3-methoxy-3-oxo-1-propenyl]phenoxy}octyl)oxy]benzyl bromide 2.39 g (3.08 mmol) of 3,5-bis[(8-{2-methoxy-4-[(1E)-3-methoxy-3-oxo-1-propenyl]phenoxy}octyl)oxy]benzyl alcohol, 1,14 g (3.42 mmol) tetrabromomethane were dissolved in 25 ml dichloromethane. The solution was subsequently cooled to 0° C. and a solution of 0.86 g (3.29 mmol) triphenylphosphine in 20 ml dichloromethane was added dropwise thereto over a period of 1 hour. The mixture was subsequently allowed to react for 20 h at 25° C. and reduced in volume by evaporation. Chromatography of the residue on 120 g silica gel using first toluene:ethyl acetate (19:1) then (4:1) as eluant yielded 1.94 g (78%) 3,5-bis[(8-{2-methoxy-4-[(1E)-3-methoxy-3-oxo-1-propenyl]phenoxy}octyl)oxy] benzyl bromide as colorless oil.

Preparation of 6-(methacryloyloxy)hexyl 3,5-dihydroxybenzoate 2.27 g (14.72 mmol) 3,5-dihydroxybenzoic acid was dissolved in 32 ml N,N-dimethylformamide. A solution of 2.24 g (14.72 mmol) 1,8-diazabicyclo[5.4.0]undec-7-ene(1,5-5) (DBU) and 17 ml N,N-dimethylformamide were added dropwise over a period of 30 minutes. A solution of 3.96 g (13.38 mmol) 6-iodohexyl 2-methacrylate and 17 ml N,N-dimethylformamide were added dropwise over a period of 40 minutes and the resulting mixture was then allowed to react for 22 hours at 25° C. The reaction mixture was cooled and then partitioned between ethyl acetate and water. The organic phase was washed repeatedly with water, dried over sodium sulfate, filtered and concentrated by rotary evaporation. Chromatography of the residue on 110 g silica gel using first toluene:ethyl acetate (4:1) then (7:3) as eluant yielded 3.57 g (80%) 6-(methacryloyloxy)hexyl 3,5-dihydroxybenzoate as white powder.

Synthetic Example 4

Polymerization of Dendrimer 3

A mixture of 0.398 g (0.216 mmol) Dendrimer 3 and 0.4 mg (0.0024 mmol) α,α'-azoisobutyronitrile (AIBN) in 0.50 ml dry tetrahydrofuran (THF) was degassed in a sealable tube. The tube was then sealed under argon and stirred at 60° C. for 16.5 h. The resulting polymer precipitated into 50 ml t.butyl-methyl ether and collected. The polymer was reprecipitated from THF (2.0 ml) into 30 ml methanol to yield 0.12 g (30%)] Poly-[1-[6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}hexyloxy]-1-methylethylene] as a solid; $M_n=4.2\times10^4$, pdi=1.48.

Synthetic Example 5

Preparation of di[3,5-bis({4-[3,5-bis[({6-[(2-oxo-2H-chromen-7-yl)oxy]hexyl}oxy)carbonyl]phenoxy]butoxy}carbonyl)phenyl]1,1-biphenyl-4,4'-dicarboxylate

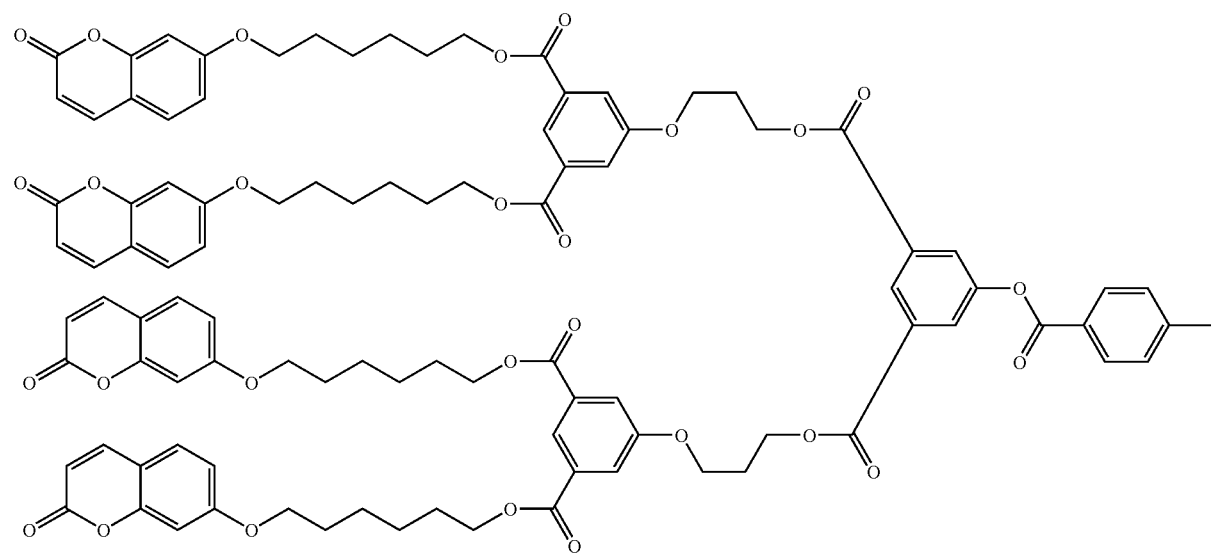

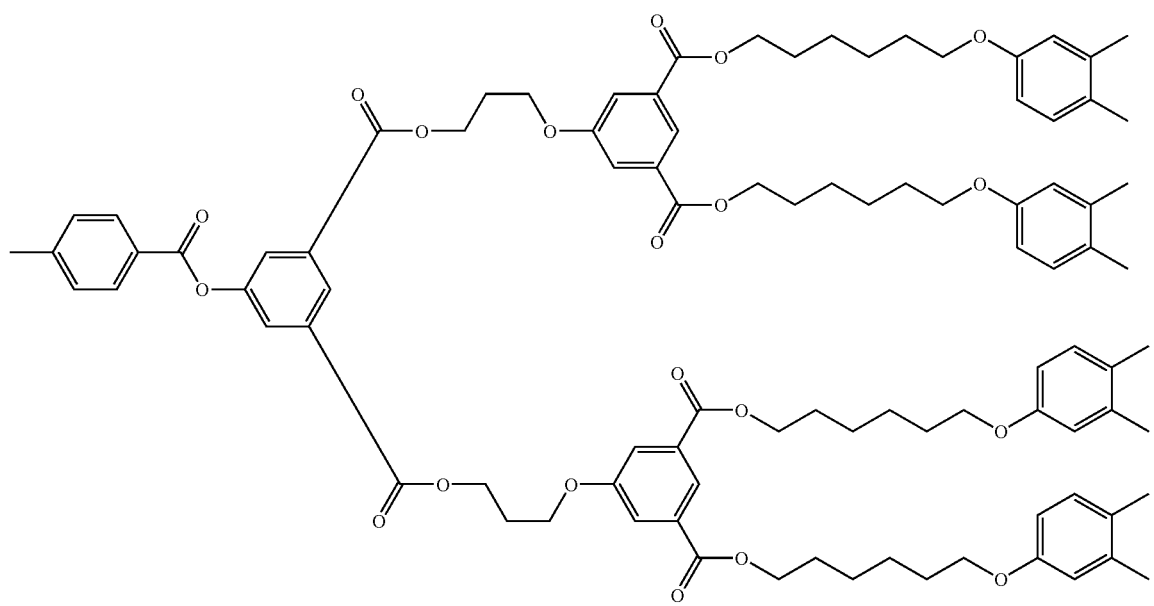

0.28 g (1.0 mmol) 4,4'-Biphenyldicarbonyl chloride, 4.00 g (2.5 mmol) 1,3-bis(4-{3,5-bis[({6-[(2-oxo-2H-chromen-7-yl)oxy]hexyl}oxy)carbonyl]phenoxy}butyl) 5-hydroxyisophthalate and 6 mg (0.05 mmol) 4-dimethylaminopyridine were added in 50 ml toluene. Thereafter 5.0 ml pyridine were added and the reaction mixture was allowed to react for 18 hours at refluxing temperature. The reaction mixture was partitioned between ethyl acetate and water. The organic phase was washed repeatedly with water, dried over sodium sulfate, filtered and concentrated by rotary evaporation. First chromatography of the residue on silica gel and second chromatography on LiChroprep RP-18 yielded di[3,5-bis({4-[3,5-bis[({6-[(2-oxo-2H-chromen-7-yl)oxy]hexyl}oxy)carbonyl]phenoxy]butoxy}carbonyl)phenyl]1,1-biphenyl-4,4'-dicarboxylate.

The intermediates used as starting material were prepared in accordance with the following procedure.

Preparation of 7-(6-chlorohexyl)coumarin

Preparation can be carried out analogously to Synthetic Example 1 using 16.2 g (100 mmol) 7-Hydroxycoumarin, 14.3 g (105 mmol) 6-chlorohexanol, 28.8 g (110 mmol) triphenylphosphine and 47.9 g (110 mmol) of a 40% solution of azodicarboxylic acid diethyl ester in toluene to yielded 7-(6-chlorohexyl) coumarin.

Preparation of bis{6-[(2-oxo-2H-chromen-7-yl)oxy]hexyl}5-hydroxyisophthalate 5.64 g (20.0 mmol) 7-(6-chlorohexyl) coumarin and 1.82 g (10.0 mmol) 5-hydroxyisophthalic acid were dissolved in 240 ml 1-methyl-2-pyrrolidon. 4.87 g (58.0 mmol) sodium hydrogencarbonate were added. The reaction suspension was then heated at 80° C. for 4 hours. The reaction mixture was partitioned between ethyl acetate and water. The organic phase was water, dried over sodium sulfate, filtered and concentrated by rotary evaporation. Chromatography of the residue yielded bis{6-[(2-oxo-2H-chromen-7-yl)oxy]hexyl}5-hydroxyisophthalate.

Preparation of bis{6-[(2-oxo-2H-chromen-7-yl)oxy]hexyl}5-(4-chlorobutoxy)isophthalate Preparation can be carried out analogously to Synthetic Example 1 using 6.71 g (10.0 mmol) bis{6-[(2-oxo-2H-chromen-7-yl)oxy]hexyl}5-hydroxyisophthalate, 1.14 g (10.5 mmol) 4-chloro-1-butanol, 2.88 g (11.0 mmol) triphenylphosphine and 4.79 g (11.0 mmol) of a 40% solution of azodicarboxylic acid diethyl ester in toluene to yield bis{6-[(2-oxo-2H-chromen-7-yl)oxy]hexyl}5-(4-chlorobutoxy)isophthalate.

Preparation of 1,3-bis(4-{3,5-bis[({6-[(2-oxo-2H-chromen-7-yl)oxy]hexyl}oxy)carbonyl]phenoxy}butyl)5-hydroxyisophthalate Preparation can be carried out as above using 15.2 g (20.0 mmol) bis{6-[(2-oxo-2H-chromen-7-yl)oxy]hexyl}5-(4-chlorobutoxy)isophthalate, 1.82 g (10.0 mmol) 5-hydroxyisophthalsäure and 4.87 g (58.0 mmol) sodium hydrogencarbonate to yield 1,3-bis(4 {3,5-bis[({6-[(2-oxo-2H-chromen-7-yl)oxy]hexyl}oxy)carbonyl]phenoxy}butyl) 5-hydroxyisophthalate.

Synthetic Example 6

Preparation of 1,1,1-tris[4-{([2,2-bis{([2,2-bis{[(6-{4-[(1E)-3-oxo-1-butenyl]phenoxy}hexanoyl)oxy]methyl}propanoyl]oxy)methyl}propanoyl]oxy)phenyl}]ethane

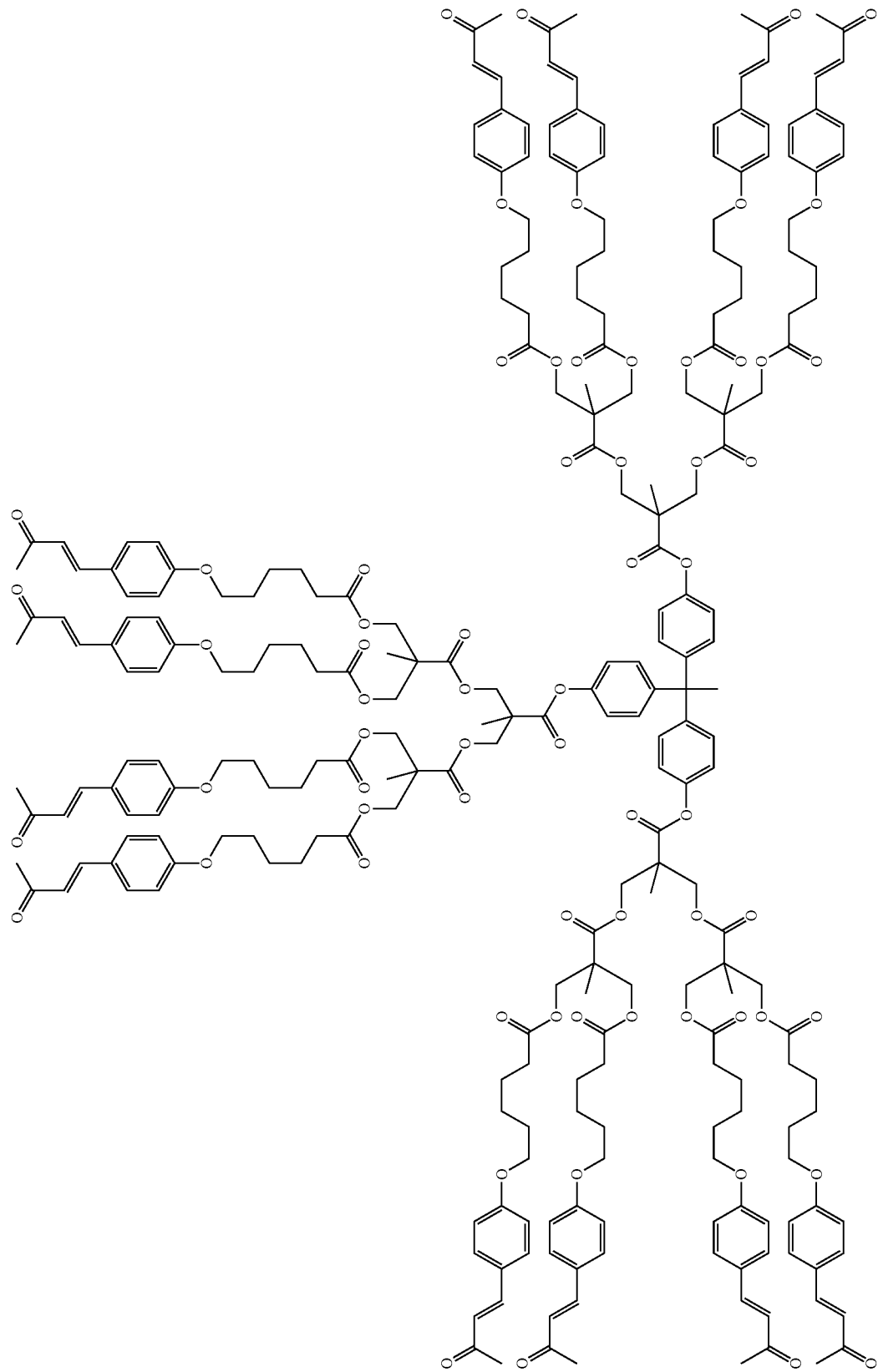

1.00 g (3.39 mmol) 6-{(4-[(1E)-3-oxo-1-butenyl]phenoxy}hexanoyl chloride were diluted in a small amount of tetrahydofurane and added at 0° C. dropwise to a solution of 0.35 g (0.26 mmol) 1,1,1-tris[4-{([2,2-bis{([2,2-bis{hydroxymethyl}propanoyl]oxy)methyl}propanoyl]oxy)phenyl}]ethane, 0.180 g (1.47 mmol) 4-dimethylaminopyridine, 0.446 g (4.41 mmol) triethylamine and 20 ml tetrahydrofurane. After stirring at 0° C. for 1 hour, the mixture was allowed to react at 25° C. for a further 24 hours. The mixture was concentrated by rotary evaporation. The residue was dissolved in dichloromethane washed repeatedly first with a saturated sodium hydrogencarbonte solution and then with 2N HCl. The organic phase was dried over sodium sulfate, filtered and concentrated by rotary evaporation. The dendrimer was reprecipitated from tetrahydrofurane into methanol to yield 1,1,1-tris[4{([2,2-bis{([2,2-bis{[(6-{4-[(1E)-3-oxo-1-butenyl]phenoxy}hexanoyl)oxy]methyl}propanoyl]oxy)methyl}propanoyl]oxy)phenyl}]ethane.

The intermediates used as starting material were prepared in accordance with the procedure described by Frechet, J. M. in Macromolecules 1998, 31, 4061, and with the following procedure.

Preparation of 6-{4-[(1E)-3-ooxobut-1-enyl]phenoxy}hexanoic acid 1.62 g (10.0 mmol) 4-Hydroxybenzylideneacetone, 3.98 g (15.0 mmol) tetrahydro-2H-pyran-2-yl 5-bromopentanoate were dissolved in N,N-dimethylformamide. 3.45 g (25.0 mmol) potassium carbonate were added. The reaction suspension was then heated at 70° C. for 8 hours. The reaction mixture was partitioned between ethyl acetate and a saturated sodium chloride solution. The organic phase was washed repeatedly with water, dried over sodium sulfate, filtered and concentrated by rotary evaporation. The residue was dissolved in 50 ml tetrahydrofurane and 1 ml HCl concentrated was added. The mixture was stirred at 25° C. for 45 min, partitioned between dichloromethane and a saturated sodium chloride solution. The organic phase was washed repeatedly with water, dried over sodium sulfate, filtered and concentrated by rotary evaporation to yield 6-{4-[(1E)-3-ooxobut-1-enyl]phenoxy}hexanoic acid.

Example 1

Preparation of Alignment Layers Using Dendrimer 3 a/ Preparation of Alignment Layers

A 1% wt solution of the photoreactive Dendrimer 3, including or not a 2% wt of a photoinitiator (Irgacure 184 from Ciba), in cyclopentanone was spin coated at 3000 rpm onto glass plates. The layers were annealed at temperature above 70° C. to remove residual solvent and treated using various cross-linking conditions:

Treatment 1: The layers were irradiated with isotropic UV light to cross-link the polymerisable groups, then exposed to linearly polarized UV light with an energy up to 660 mJ/cm$^2$, from a 350 W mercury high pressure lamp.

Treatment 2: The layers were exposed to linearly polarized UV light, as indicated above, then irradiated with isotropic UV light to cross-link the polymerisable groups.

Treatment 3: The layers are exposed to linearly polarized UV-light and simultaneously cross-linked under N$_2$ atmosphere.

b/ Preparation of a Retardation Layer

The resulting layers were then spin coated with an LCP mixture CB483 (available from Vantico AG), annealed at 50° C. for 5 minutes and then cross-linked with isotropic UV light for 5 minutes. The total LCP film thickness is about 1 micrometer. Observation of the coatings between crossed polarizers showed that the liquid crystal is uniformly oriented for exposure energies above 66 mJ/cm$^2$. Using a tilt compensator and a polarization microscope, the orientation direction of LCP molecules was established to be parallel to the direction of polarization of UV light which had irradiated the alignment layers. Contrast ratio as high as 1000:1 was measured.

c/ Preparation of an LC Cell

With the coated sides facing inwards, coated plates from Example 1a were assembled into parallel-sided LC cells using glass spheres of 20 micrometers thickness as spacer. Two different cells, cell1 and cell2, were prepared using alignment layers according to treatment 1 and treatment 2, respectively. The cells were filled with a nematic liquid crystal mixture MLC12000-000 (Merck) at a temperature well above it's nematic-isotropic transition temperature (T$_c$=89° C.), and slowly cooled to room temperature. Observation of the prepared cell between crossed polarizers showed that the liquid crystal is uniformly oriented. Using a tilting compensator and a polarization microscope, the orientation direction of the LC molecules was established to be parallel to the direction of polarization of UV light which had irradiated the alignment layers.

For both cells the tilt angle generated in the LC layer, measured using the standard crystal rotation method (TBA105 from Autronics Melchers), was 0.2°. It was also found that illumination times required to align the LC mixture are smaller using the treatment 1 of Example 1a.

Example 2

Preparation of Alignment Layers Using Mixtures of Dendrimer 3 and a Photoactive Monomer Solution Sol 1: A binary mixture of 90% of photoreactive Dendrimer 3 and 10% of a photoactive monomer of the type disclosed in WO-00/55110 and including 2 parts of a photoinitiator (Irgacure 184 from Ciba) was added to cyclopentanone to achieve a 2% wt solution. The solution was then stirred at room temperature for 10 minutes and filtered over a 0.2 micrometer Teflon filter.

Solution Sol2: A binary mixture of 70% of photoreactive Dendrimer 3 and 30% of the photoactive monomer used for Sol1 and including 2 parts of a photoinitiator (Irgacure 184 from Ciba), was added to cyclopentanone to achieve a 2% wt solution. The solution was then stirred at room temperature for 10 minutes filtered over a 0.2 micrometer Teflon filter.

Each of these solutions was spin coated at 3000 rpm onto two ITO-coated glass plates. The resulting films were cross-linked and linearly polarized according to treatment 1 of Example 1a. Then the layers were assembled to fabricate LC cells as indicated in Example 1c. Observation of the prepared cells between crossed polarizers showed that the liquid crystal is uniformly oriented. Using a tilting compensator and a polarization microscope, the orientation direction of the LC molecules was established to be parallel to the direction of polarization of UV light which had irradiated the alignment layers. The measured tilt angle generated in the LC layer using a 66 mJ/cm2 exposure energy was about 1° for alignment layers made from the solution Sol1 and about 90° using alignment layers made from Sol2.

Example 3

Preparation of Alignment Layers Using Poly-[1-[6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}-hexyloxy]-1-methylethylene]

A 2% solution of Poly-[1-[6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}hexyloxy]-1-methylethylene] (Synthetic Example 4) in cyclopentanone was spin coated at 3000 rpm onto ITO-coated glass substrates and annealed for 10 minutes at 180° C. The layers were exposed to linearly polarized UV light from a 350 W mercury high pressure lamp. The resulting aligning layers were assembled to fabricate LC cells as described in Example 1c. Observation of the prepared cell between crossed polarizers showed that the liquid crystal is uniformly oriented. Using a tilting compensator and a polarization microscope, the orientation direction of the LC molecules was established to be parallel to the direction of polarization of WV light which had irradiated the alignment layers. Tilt angles are generated in the LC layer, which were measured using the standard crystal rotation method (TBA105 from Autronics Melchers) as of about 36° using an exposure energy of 33 mJ/cm$^2$ and about 190 using an exposure energy of 66 mJ/cm$^2$.

Example 4

Preparation of Alignment Layers Using Dendrimer 1

A 2% solution of the photoreactive Dendrimer 1 in cyclopentanone was spin coated at 3000 rpm onto glass substrates and annealed at temperature above 70° C. to remove residual solvent. The layers were exposed to linearly polarized UV light, with energies up to 660 mJ/cm$^2$, from a 350 W mercury high pressure lamp. The intensity of the UV light at the plate was determined as 1 mw/cm$^2$.

Then two layers were assembled to fabricate an LC cell as indicated in Example 1c. Observation of the prepared cell between crossed polarizers showed that the liquid crystal is uniformly oriented. Using a tilting compensator and a polarization microscope, the orientation direction of the LC molecules was established to be parallel to the direction of polarization of UV light which had irradiated the alignment layers. The tilt angle generated in the LC layer, measured using the standard crystal rotation method (TBA105 from Autronics Melchers), is about 0.20°.

Example 5

Preparation of Alignment Layers Using Mixtures of a Dendrimer and a Photoreactive Polyimide A 2% wt solution was fabricated using a binary mixture consisting of 95 parts of a photoreactive polyimide (resulting form the polycondensation reaction between 1,2,3,4-cyclobutanetetracarboxylic acid dianhydride and 6-{2-methoxy-4-[(1E)-3-oxo-1-propenyl]phenoxy}hexyl 3,5-diaminobenzoate) of the type disclosed in WO-A-99/15576 and 5 parts of Dendrimer 3. The solution was then stirred at room temperature for 10 min. and filtered over a 0.2 micrometer Teflon filter. The solution was spin coated at 3000 rpm onto ITO-coated glass plates. The resulting films were then pre-dried for 15 minutes at 130° C. and imidised for 1 hour at 180° C. to, form the polyimide. The plates were then irradiated for 90 seconds with linearly polarized UV light of a 350 W high-pressure mercury vapor lamp. A liquid crystalline mixture of diacrylates (AN43 from Rolic Research Ltd) was spin-coated, annealed at 50° C. during 5 minutes and finally cross-linked with isotropic UV light for 5 minutes. The total LCP film thickness was about 1 micrometer. Observation of the coatings between crossed polarizers showed that the liquid crystal is uniformly oriented. Using a tilt compensator and a polarization microscope, the orientation direction of the LCP molecules was established to be parallel to the direction of polarization of UV light which had irradiated the alignment layers. Contrast ratio as high as 1300:1 was measured. By repeating the same experiment using a 2 wt % solution of pure photoreactive polyimide, instead of the above mixture, contrast ratio of only 200:1 was measured.

The invention claimed is:

1. Photoreactive dendrimers comprising a core portion, branching units and terminal groups, wherein at least one terminal group and/or branching unit is a photoreactive group, wherein the photoreactive groups are represented by the general formulae Ia and Ib:

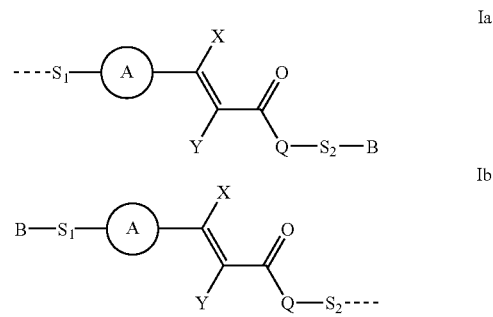

wherein the broken line indicates the point of linkage to the outermost generation of the dendrimer and A represents pyrimidine-2,5-diyl, pyridine-2,5-diyl, 2,5-thiophenylene, 2,5-furanylene, 1,4- or 2,6-naphthylene; or phenylene, which is unsubstituted or mono- or poly-substituted by fluorine, chlorine or by a cyclic, straight-chain or branched alkyl residue which is unsubstituted mono- or poly-substituted by fluorine, chlorine, having 1 to 18 carbon atoms, wherein one or more non-adjacent —$CH_2$—groups may independently be replaced by a group C; wherein C represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —Si$(CH_3)_2$—O—Si$(CH_3)_2$—, wherein $R^1$ represents hydrogen or lower alkyl;

B represents hydrogen, or a group which is able to react or interact with a second material like polymers, oligomers, monomers, photoactive polymers, photoactive oligomers and/or photoactive monomers or surfaces;

$S_1$ and $S_2$ each independently of the other represent a single bond or a spacer unit such as a straight-chain or branched alkylene group which is unsubstituted, mono or poly-substituted by fluorine, chlorine, having 1 to 40 carbon atoms, wherein one or more non-adjacent —$CH_2$— groups may independently be replaced by a group D, with the proviso that oxygen atoms are not directly attached to each other; wherein D represents a group selected from —O—, —CO—, —CO—O—, —O—CO—, —$NR^1$—, —$NR^1$—CO—, —CO—NR$^1$—, —NR$^1$—CO—O—, —O—CO—NR$^1$—, —NR$^1$—CO—NR$^1$—, —CH=CH—, —C≡C—, —O—CO—O— and —Si(CH$_3$)$_2$—O—Si(CH$_3$)$_2$—, an aromatic or an alicyclic group, wherein R$^1$ represents hydrogen or lower alkyl;

Q represents oxygen or —NR$^1$— wherein R$^1$ represents hydrogen or lower alkyl; and X, Y each independently of the other represents hydrogen, fluorine, chlorine, cyano, alkyl optionally substituted by fluorine having 1 to 12 carbon atoms in which optionally one or more non-adjacent alkyl —CH$_2$— groups are replaced by —O—, —CO—O—, —O—CO— and/or —CH=CH—.

2. Photoreactive dendrimers according to claim 1, wherein A is selected from pyrimidine-2,5-diyl, pyridine-2,5-diyl, 2,5-thiophenylene, 2,5-furanylene, 1,4- or 2,6-naphthylene and phenylene, which is unsubstituted or substituted by a cyclic, straight-chain or branched alkyl residue which is unsubstituted, mono- or poly-substituted by fluorine, chlorine having from 1 to 12 carbon atoms in which optionally one or more non-adjacent alkyl —CH$_2$— groups are replaced by —O—, —CO—, —CO—O—, —O—CO—, —CH=CH— and C—C≡C—.

3. Photoreactive dendrimers according to claim 2, wherein A is selected from 2,5-furanylene, 1,4- or 2,6-naphthylene and phenylene, which is unsubstituted or substituted by a cyclic, straight-chain or branched alkyl residue having 1 to 12 carbon atoms in which optionally one or more non-adjacent alkyl —CH$_2$— groups are replaced by —O—, —CO—, —CO—O—, —O—CO—, —CH=CH— and —C≡C—.

4. Photoreactive dendrimers according to 1, wherein B is a radically or cationically polymerizable group; hydrophilic anionic groups like groups consisting of —OSO$_2$O$^-$, —SO$_2$O$^-$, —CO$_2^-$, (—O)$_2$P(O)O$^-$, —P(O)(O$^-$)$_2$, —OP(O)(O$^-$)$_2$, —P(O$^-$)$_2$ and —OP(O$^-$)$_2$ in protonated or salt form e.g. as alkali metals salts or ammonium salts; polar groups like alcohol, thiol and isocyanate; and also mono- di-tri-alkoxy or halogeno silanes.

5. Photoreactive dendrimers according to claim 4, wherein B is selected from hydrogen, radically or cationically polymerizable groups or mono-, di-, tri-alkoxy or halogeno silanes.

6. Photoreactive dendrimers according to claim 4, wherein B is selected from hydrogen or radically or cationically polymerizable groups.

7. Photoreactive dendrimers according to claim 4, wherein B is hydrogen.

8. Photoreactive dendrimers according to claim 1, wherein Q is O or —NH—.

9. Photoreactive dendrimers according to claim 8, wherein Q is O.

10. Photoreactive dendrimers according to claim 1, wherein the groups X and Y represent hydrogen.

11. Photoreactive dendrimers according to claim 1, wherein the photoactive groups are groups of formula Ia.

12. Photoreactive dendrimers according to claim 1, wherein S$_1$ is selected from a single covalent bond, —O—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O— and a straight-chain or branched alkylene group, which is optionally substituted by one or more groups selected from fluorine, chlorine and cyano and in which two or three non-adjacent alkylene —CH$_2$— groups are independently optionally replaced by a group D with the proviso that the total number of chain carbon atoms in the alkylene group does not exceed 24, wherein R$^1$ represents hydrogen or lower alkyl.

13. Photoreactive dendrimers according to claim 12, wherein S$_1$ is selected from a single covalent bond, —CO—O—, —O—CO—, —(CH$_2$)$_r$—, —(CH$_2$)$_r$—O—, —(CH$_2$)$_r$—CO—, —(CH$_2$)$_r$—CO—O—, —(CH$_2$)$_r$—O—CO—, —(CH$_2$)$_r$—CO—NR$^1$—, —(CH$_2$)$_r$—NR$^1$—CO—, —(CH$_2$)$_r$—NR$^1$—, —O—(CH$_2$)$_r$—, —CO—O—(CH$_2$)$_r$—, —O—CO—(CH$_2$)$_r$—, —NR$^1$—CO—(CH$_2$)$_r$—, —CO—NR$^1$—(CH$_2$)$_r$—, —NR$^1$—(CH$_2$)$_r$—, —O—(CH$_2$)$_r$—CO—O—, —O—(CH$_2$)$_r$—O—CO—, —O—(CH$_2$)$_r$—CO—NR$^1$—, —O—(CH$_2$)$_r$—NR$^1$—, —O—(CH$_2$)$_r$—O—, —O—(CH$_2$)$_r$—NR$^1$—CO—, —NR$^1$—(CH$_2$)$_r$—CO—O—, —NR$^1$—(CH$_2$)$_r$—O—, —NR$^1$—(CH$_2$)$_r$—NR$^1$—, —NR$^1$—(CH$_2$)$_r$—O—CO—, —CO—NR$^1$—(CH$_2$)$_r$—O—, —CO—NR$^1$—(CH$_2$)$_r$—NR$^1$—, —CO—NR$^1$—(CH$_2$)$_r$—O—CO—, —O—CO—(CH$_2$)$_r$—CO—, —O—CO—(CH$_2$)$_r$—O—, —O—CO—(CH$_2$)$_r$—NR$^2$—, —O—CO—(CH$_2$)$_r$—CO—O—, —O—CO—(CH$_2$)$_r$—CO—NR$^1$—, —O—CO—(CH$_2$)$_r$—NR$^1$—CO—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$—CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH$_2$)$_r$—O—CO—(CH$_2$)$_s$—O—, —(CH$_2$)$_s$—O—, —(CH$_2$)$_r$—NR$^1$—CO—(CH$_2$)$_s$—O—, —(CH$_2$)$_r$—NR$^1$—CO—O—(CH$_2$)$_s$—O—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—O—(CH$_2$)$_s$—, —O—(CH$_2$)$_r$—CO—O—(CH$_2$)$_s$—O—, —O—(CH$_2$)$_r$—O—(CH$_2$)$_s$—O—, —O—(CH$_2$)$_r$—NR$^1$—CO—(CH$_2$)$_s$—O—, —O—(CH$_2$)$_r$—NR$^1$—CO—O—(CH$_2$)$_s$—O—, —CO—O—(CH$_2$)$_r$—O—(CH$_2$)$_s$— and —CO—O—(CH$_2$)$_r$—O—(CH$_2$)$_s$—O—, wherein R$^1$ is as defined above, r and s each represent an integer from 1 to 20, preferably from 1 to 12, and r+s≦21, preferably ≦15.

14. Photoreactive dendrimers according to claim 12, wherein S$_1$ is selected from a single covalent bond, —(CH$_2$)$_r$—, —(CH$_2$)$_r$—O—, —(CH$_2$)$_r$—CO—O—, —(CH$_2$)$_r$—O—CO—, —(CH$_2$)$_r$—CO—NH—, —(CH$_2$)$_r$—NH—CO—, —O—(CH$_2$)$_r$—, —CO—O—(CH$_2$)$_r$—, —CO—NH—(CH$_2$)$_r$—, —O—CO—(CH$_2$)$_r$—, —O—CO—(CH$_2$)$_r$—CO—O—, —O—(CH$_2$)$_r$—O—CO—, —O(CH$_2$)$_r$—CO—NH—, —O—(CH$_2$)$_r$—NH—CO—, —CO—O—(CH$_2$)$_r$—O—, —CO—NH—(CH$_2$)$_r$—O—, —O—(CH$_2$)$_r$—O—, —(CH$_2$)$_r$—NH—CO—(CH$_2$)$_s$—, —(CH$_2$)$_r$—NH—CO—O—(CH$_2$)$_s$—, —(CH$_2$)$_r$—O—(CH$_2$)$_s$—O—, —(CH$_2$)$_r$—NH—CO—(CH$_2$)$_s$—O—, —(CH$_2$)$_r$—NH—CO—O—(CH$_2$)$_s$—O—, —O—(CH$_2$)$_r$—NH—CO—(CH$_2$)$_s$—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, —O—(CH$_2$)$_r$—NH—CO—(CH$_2$)$_s$—O— and —O—CO—(CH$_2$)$_r$—NH—CO—(CH$_2$)$_s$—O—, wherein r and s each represent an integer from 1 to 12 and r+s≦15.

15. Photoreactive dendrimers according to claim 12, wherein S$_1$ includes 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

16. Photoreactive dendrimers according to claim 1, wherein $S_2$ is selected from a single covalent bond, a straight-chain or branched alkylene group, which is optionally substituted by one or more groups selected from fluorine, chlorine and cyano and in which two or three non-adjacent alkylene —$CH_2$— groups are independently optionally replaced by a group D with the proviso that the total number of chain carbon atoms in the alkylene group does not exceed 24, wherein $R^1$ represents hydrogen or lower alkyl.

17. Photoreactive dendrimers according to claim 16, wherein $S_2$ is selected from a single covalent bond, —$(CH_2)_r$—, —$(CH_2)_r$—O—, —$(CH_2)_r$—CO—, —$(CH_2)_r$—CO—O—, —$(CH_2)_r$—O—CO—, —$(CH_2)_r$—CO—$NR^1$—, —$(CH_2)_r$—$NR^1$—CO—, —$(CH_2)_r$—$NR^1$—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^1$—CO—$(CH_2)_s$—, —$(CH_2)_r$—$NR^1$—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—$NR^1$—CO—$(CH_2)_s$—O—, —$(CH_2)_r$—$NR^1$—CO—O—$(CH_2)_s$—O—, —$(CH_2)_r$—O—$(CH_2)_s$—CO—O— and —$(CH_2)_r$—O—$(CH_2)_s$—O—CO—, wherein $R^1$ is as defined herein above; and r and s each represent an integer from 1 to 20; and r+s≦21. It is more preferred that r and s each represent an integer from 1 to 12. It is especially preferred that r+s≦15.

18. Photoreactive dendrimers according to claim 16, wherein $S_2$ includes 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexylene, 6-(3-propyleneiminocarbonyl)hexyloxy and the like.

19. Photoreactive dendrimers comprising a core portion, branching units and terminal groups, wherein at least one terminal group and/or branching unit is a photoreactive group, wherein the terminal moieties can also be hydrogen; or a group which is able to react or interact with a second material like polymers, oligomers, monomers, photoactive polymers, photoactive oligomers and/or photoactive monomers or surfaces; or an unit such as a straight-chain or branched alkyl group which is unsubstituted, mono or polysubstituted by fluorine, chlorine, cyano, having 1 to 24 carbon atoms, wherein one or more —$CH_2$— groups may independently be replaced by a group D, with the proviso that oxygen atoms of D are not directly attached to each other, wherein D represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —Si($CH_3$)$_2$—O—Si($CH_3$)$_2$—, an aromatic or an alicyclic group, wherein $R^1$ represents hydrogen or lower alkyl.

20. Photoreactive dendrimers comprising a core portion, branching units and terminal groups, wherein at least one terminal group and/or branching unit is a photoreactive group, wherein the branching units are represented by dendritic blocks of the general formulae IIa, IIb or a combination of them, for example formula IIc:

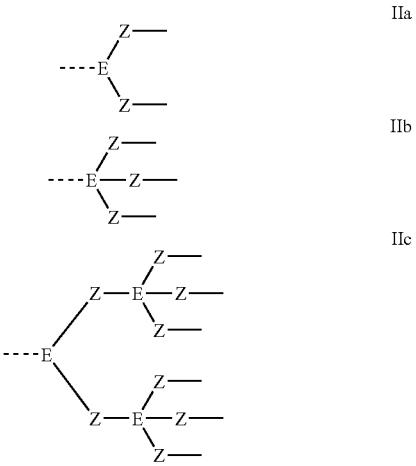

wherein
the broken line indicates the point of linkage to the core portion or to the Z units of the previous generation of branching units; and
the full line indicates the point of linkage to the B residue of the next generation of branching units or the point of linkage to the terminal groups; and wherein E represents an organic residue;

Z represents photoreactive groups like groups represented by formula Ia and Ib:

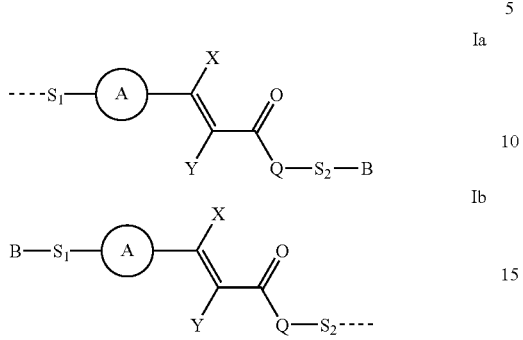

wherein the broken line indicates the point of linkage to the outermost generation of the dendrimer and A represents pyrimidine-2,5-diyl, pyridine-2,5-diyl, 2,5-thiophenylene, 2,5-furanylene, 1,4- or 2,6-naphthylene; or phenylene, which is unsubstituted or mono- or poly-substituted by fluorine, chlorine or by a cyclic, straight-chain or branched alkyl residue which is unsubstituted mono- or poly-substituted by fluorine, chlorine, having 1 to 18 carbon atoms, wherein one or more non-adjacent —$CH_2$— groups may independently be replaced by a group C; wherein C represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —$Si(CH_3)_2$—O—$Si(CH_3)_2$—, wherein $R^1$ represents hydrogen or lower alkyl;

B represents the point of linkage to E;

$S_1$ and $S_2$ each independently of the other represent a single bond or a spacer unit such as a straight-chain or branched alkylene group which is unsubstituted, mono or poly-substituted by fluorine, chlorine, having 1 to 40 carbon atoms, wherein one or more non-adjacent —$CH_2$— groups may independently be replaced by a group D, with the proviso that oxygen atoms are not directly attached to each other; wherein D represents a group selected from —O—, —CO—, —CO—O—, —O—CO—, —$NR^1$—, —$NR^1$—CO—, —CO—$NR^1$—, —$NR^1$—CO—O, —O—CO—$NR^1$—, —$NR^1$—CO—$NR^1$—, —CH=CH—, —C≡C—, —O—CO—O— and —$Si(CH_3)_2$—O—$Si(CH_3)_2$—, an aromatic or an alicyclic group, wherein $R^1$ represents hydrogen or lower alkyl;

Q represents oxygen or —$NR^1$— wherein $R^1$ represents hydrogen or lower alkyl; and X, Y each independently of the other represents hydrogen, fluorine, chlorine, cyano, alkyl optionally substituted by fluorine having 1 to 12 carbon atoms in which optionally one or more non-adjacent alkyl —$CH_2$— groups are replaced by —O—, —CO—O—, —O—CO— and/or —CH=CH—.

21. Photoreactive dendrimers comprising a core portion, branching units and terminal groups, wherein at least one terminal group and/or branching unit is a photoreactive group, wherein the branching units are represented by dendritic blocks of the general formulae IIa, IIb or a combination of them, for example formula IIc:

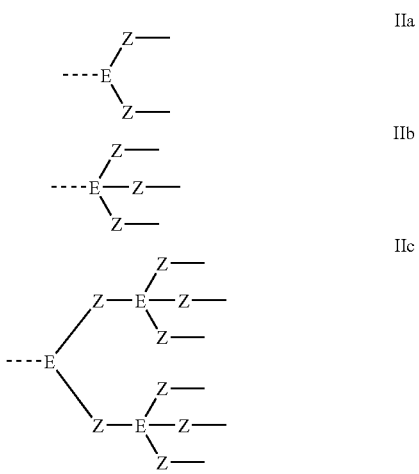

wherein the broken line indicates the point of linkage to the core portion or to the Z units of the previous generation of branching units; and the full line indicates the point of linkage to the E residue of the next generation of branching units or the point of linkage to the terminal groups; and wherein E represents an organic residue; and wherein Z includes 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7- heptylenedioxy, 1,8-octylenedioxy, 1,9-nonylenedioxy, 1,10-decylenedioxy, 1,11-undecylenedioxy, 1,12-dodecylenedioxy, 2-{4-[4-(2-oxyethyl)cyclohexyl]phenyl}ethoxy, 2[4'-(4-oxybutyl)-1,1'biphenyl-4-yl]ethoxy, 2-{4-[4-(2-oxy-ethyl)phenyl}ethoxy, 2-{4-[4-(2-carbonyloxyethyl)-cyclohexyl]phenyl}ethoxy, 2-[4'-(4-carbonyloxybutyl)-1,1'biphenylene-4-yl]ethoxy, 6-{4-[4-(2-carbonyloxyethyl)phenyl}hexyloxy, 5-{[4'-(4-oxybutoxy)-1,1'-biphenyl-4-yl]oxy}pentylcarbonyloxy, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)hcptylene, 8-(carbonyloxy)octylene, 9-(carbonyloxy)nonylene, 10-(carbonyloxy)decylene, 11-(carbonyloxy)undecylene, 12-(carbonyloxy)dodecylcne, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonyipropylene, 4-iminocarbonylbutylene, 5-iminocarbonylpentylene, 6-iminocarbonyihexylene, 7-iminocarbonyiheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene, 6-oxyhexyl(2E)-3-[4-(4-oxybutoxy)-3-methoxyphenyl]-2-propenoate, 8-oxyoctyl(2E)-3-[4-(5-oxypentoxy)phenyl]-2-propenoate, 6-oxyhexyl(2E)-3-[4-(4-(carbonyloxy)butoxy)-3-methoxyphenyl]-2-propenoate, 8-(oxycarbonyl)octyl(2E)-3-[4-(5-oxypentoxy)phenyl]-2-propenoate and the like.

22. Photoreactive dendrimers comprising a core portion, branching units and terminal groups, wherein at least one terminal group and/or branching unit is a photoreactive group, wherein the core portion is covalently bonded to one, two, three or four dendritic blocks and are represented by formulae IIIa, IIIb, IIIc, IIId and IIIe:

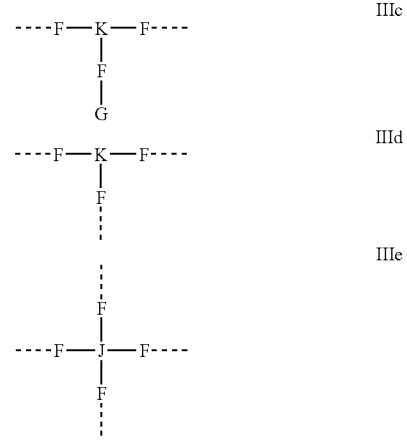

wherein the broken line indicates the point of linkage with a branching unit and wherein F represents a single bond or a unit such as a straight-chain or branched alkylene group which is unsubstituted, mono or poly-substituted by fluorine, chlorine, having 1 to 40 carbon atoms, wherein one or more —$CH_2$— groups may independently be replaced by a group D, with the proviso that oxygen atoms are not directly attached to each other, or F represents a photoreactive group like groups represented by general formula Ia and Ib;

G represents hydrogen; a group which is able to react or interact with a second material like polymers, oligomers, monomers, photoactive polymers, photoactive oligomers and/or photoactive monomers or surfaces; or a monomer repeating unit in a homo or copolymer from a radical or cationic polymerisation;

K represents a nitrogen atom, a carbon atom, a group $CR_1$— or an aromatic or alicyclic group, which is optionally substituted by a group selected from fluorine, chlorine, cyano and a $C_{1-8}$ cyclic, straight-chain or branched alkyl group, which is optionally substituted by a single cyano group or by one or more halogen atoms and in which one or more non-adjacent alkyl —$CH_2$— groups are optionally replaced by a group selected from —O—, —CO—, —CO—O—, —O—CO—, —Si($CH_3$)$_2$—O—Si($CH_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C— and —O—CO—O—, wherein $R^1$ represents hydrogen or lower alkyl; and J represents a carbon atom or an aromatic or alicyclic group, which is optionally substituted by a group selected from fluorine, chlorine, cyano and a $C_{1-8}$ cyclic, straight-chain or branched alkyl group, which is optionally substituted by a single cyano group or by one or more halogen atoms and in which one or more non-adjacent alkyl —$CH_2$— groups are optionally replaced by a group selected from —O—, —CO—, —CO—O—, —O—CO—, —Si($CH_3$)$_2$—O—Si($CH_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C— and —O—CO—O—, wherein $R^1$ represents hydrogen or lower alkyl;

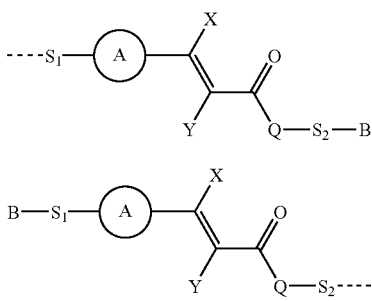

wherein the broken line indicates the point of linkage to the outermost generation of the dendrimer and A represents pyrimidine-2,5-diyl, pyridine-2,5-diyl, 2,5-thiophenylene, 2,5-furanylene, 1,4- or 2,6-naphthylene; or phenylene, which is unsubstituted or mono- or poly-substituted by fluorine, chlorine or by a cyclic, straight-chain or branched alkyl residue which is unsubstituted mono- or poly-substituted by fluorine, chlorine, having 1 to 18 carbon atoms, wherein one or more non-adjacent —$CH_2$— groups may independently be replaced by a group C; wherein C represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —$Si(CH_3)_2$—O—$Si(CH_3)_2$—, wherein $R^1$ represents hydrogen or lower alkyl;

B represents the point of linkage to the first generation of the dendrimer;

$S_1$ and $S_2$ each independently of the other represent a single bond or a spacer unit such as a straight-chain or branched alkylene group which is unsubstituted, mono or poly-substituted by fluorine, chlorine, having 1 to 40 carbon atoms, wherein one or more non-adjacent —$CH_2$— groups may independently be replaced by a group D, with the proviso that oxygen atoms are not directly attached to each other; wherein D represents a group selected from —O—, —CO—, —CO—O—, —O—CO—, —$NR^1$—, —$NR^1$—CO—, —CO—$NR^1$—, —$NR^1$—CO—O, —O—CO—$NR^1$—, —$NR^1$—CO—$NR^1$—, —CH=CH—, —C≡C—, —O—CO—O— and —$Si(CH_3)_2$—O—$Si(CH_3)_2$—, an aromatic or an alicyclic group, wherein $R_1$ represents hydrogen or lower alkyl;

Q represents oxygen or —$NR^1$— wherein $R^1$ represents hydrogen or lower alkyl; and X, Y each independently of the other represents hydrogen, fluorine, chlorine, cyano, alkyl optionally substituted by fluorine having 1 to 12 carbon atoms in which optionally one or more non-adjacent alkyl —$CH_2$— groups are replaced by —O—, —CO—O—, —O—CO— and/or —CH=CH—.

23. Photoreactive dendrimers according to claim 22, wherein F is selected from a single covalent bond, —O—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and a straight-chain or branched alkylene group, which is optionally substituted by one or more groups selected from fluorine, chlorine and cyano and in which up to four non-adjacent alkylene —$CH_2$— groups are independently optionally replaced by a group D with the proviso that the total number of chain carbon atoms in the alkylene group does not exceed 30, wherein $R^1$ represents hydrogen or lower alkyl.

24. Photoreactive dendrimers according to claim 23, wherein F represents photoreactive groups like a group represented by general formula Ia or Ib, wherein B in this case indicates the point of linkage to the first generation of the dendrimer and wherein A, $S_1$, $S_2$, Q, X and Y are as defined above.

25. Photoreactive dendrimers according to claim 23, wherein F includes 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy, 2-{4-[4-(2-oxyethyl)cyclohexyl]phenyl}ethoxy, 2-[4'-(4-oxybutyl)-1,1'biphenyl-4-yl]ethoxy, 2-{4-[4-(2-oxy-ethyl)phenyl}ethoxy, 2-{4-[4-(2-carbonyloxyethyl)-cyclohexyl]phenyl}ethoxy, 2-[4'-(2-carbonyloxybutyl)-1,1'biphenylene-4-yl]ethoxy, 6-{4-[4-(2-carbonyloxyethyl)phenyl}hexyloxy, 5-{[4'-(4-oxybutoxy)-1,1'-biphenyl-4-yl]oxy}pentylcarbonyloxy, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene, 6-oxyhexyl(2E)-3-[4-(4-oxybutoxy)-3-methoxyphenyl]-2-propenoate, 8-oxyoctyl(2E)-3-[4-(5-oxypentoxy)phenyl]-2-propenoate, 1,11-bis-[(2E)-3-(4-oxyphenyl)-2-propenoate]undecylene and the like.

26. Photoreactive dendrimers according to anyone of claims 22 to 25, wherein G is selected from hydrogen; a radically or cationically polymerizable group, or also from mono-, di- or tri-alkoxy or halogeno silanes.

27. Photoreactive dendrimers according to claim 26, wherein G is selected from hydrogen, a radically or cationically polymerizable group or a monomer unit in a homo or copolymer from a radical or cationic polymerisation.

28. Photoreactive dendrimers according to claim 26, wherein G is a radically or cationically polymerizable group.

29. Photoreactive dendrimers according to claim 22, wherein K is a nitrogen atom, a carbon atom, an aromatic, an alicyclic or a $CR^1$— unit wherein $R^1$ is as defined above.

30. Photoreactive dendrimers according to claim 29, wherein K is selected form 1,2,3-benzenetriyl, 1,3,4-benzenetriyl, 1,3,5-benzenetriyl or a group $CR^1$—.

31. Photoreactive dendrimers according to claim 22, wherein J is a carbon atom, an aromatic or an alicyclic unit.

32. Photoreactive dendrimers according to claim 31, wherein J is a carbon atom.

33. Photoreactive dendrimers according to claim 22, wherein the core portions are groups of formulae IIIa, IIIb, IIIc, IIId.

34. Photoreactive dendrimers according to claim 33, wherein the core portions are groups of formulae IIIa and IIIb.

35. Orientation layers for liquid crystals and in the construction of unstructured and structured optical elements and multi-layer systems made by using one or more photoreactive dendrimers, wherein the photoreactive dendrimers comprise a core portion, branching units and terminal groups, wherein at least one terminal group and/or branching unit is a photoreactive group.

36. A method of using photoreactive dendrimers alone or in combination with polymers, oligomers, monomers, photoactive polymers, photoactive oligomers and/or photoactive monomers, comprising producing orientation layers for liquid crystals with photoreactive dendrimers alone or in combination with polymers, oligomers, monomers, photoactive polymers, photoactive oligomers and/or photoactive monomers.

37. A method of using photoreactive dendrimers alone or in combination with polymers, oligomers, monomers, photoactive polymers, photoactive oligomers and/or photoactive monomers, comprising constructing unstructured and structured optical elements and multi-layer systems with photoreactive dendrimers alone or in combination with polymers, oligomers, monomers, photoactive polymers, photoactive oligomers and/or photo-active monomers.

38. A method according to claim 36, wherein the photoreactive dendrimers comprise a core portion, branching units and terminal groups, wherein at least one terminal group and/or branching unit is a photoreactive group.

39. Orientation layers for liquid crystals and in the construction of unstructured and structured optical elements and multi-layer systems comprising one or more photoreactive dendrimers in at least partially crosslinked form, wherein the photoreactive dendrimers comprise a core portion, branching units and terminal groups, wherein at least one terminal group and/or branching unit is a photoreactive group.

40. Orientation layers according to claim 39 further comprising polymers, oligomers, monomers, photoactive polymers, photoactive oligomers and/or photoactive monomers.

41. Electrooptical components comprising one or more orientation layer according to claim 39.

42. Optical element comprising one or more photoactive dendrimers in at least partially crosslinked form, wherein the photoreactive dendrimers comprise a core portion, branching units and terminal groups, wherein at least one terminal group and/or branching unit is a photoreactive group.

43. Optical element according to claim 42, wherein the photoreactive groups are represented by the general formulae Ia and Ib:

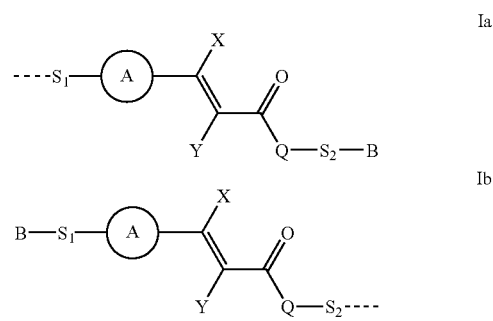

wherein the broken line indicates the point of linkage to the outermost generation of the dendrimer and A represents pyrimidine-2,5-diyl, pyridine-2,5-diyl, 2,5-thiophenylene, 2,5-furanylene, 1,4- or 2,6-naphthylene; or phenylene, which is unsubstituted or mono- or poly-substituted by fluorine, chlorine or by a cyclic, straight-chain or branched alkyl residue which is unsubstituted mono- or poly-substituted by fluorine, chlorine, having 1 to 18 carbon atoms, wherein one or more non-adjacent —$CH_2$— groups may independently be replaced by a group C; wherein C represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH═CH—, —C≡C—, —O—CO—O— and —Si($CH_3$)$_2$—O—Si($CH_3$)$_2$—, wherein $R^1$ represents hydrogen or lower alkyl;

B represents hydrogen, or a group which is able to react or interact with a second material like polymers, oligomers, monomers, photoactive polymers, photoactive oligomers and/or photoactive monomers or surfaces;

$S_1$ and $S_2$ each independently of the other represent a single bond or a spacer unit such as a straight-chain or branched alkylene group which is unsubstituted, mono or poly-substituted by fluorine, chlorine, having 1 to 40 carbon atoms, wherein one or more non-adjacent —$CH_2$— groups may independently be replaced by a group D, with the proviso that oxygen atoms are not directly attached to each other; wherein D represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —Si$(CH_3)_2$—O—Si$(CH_3)_2$—, an aromatic or an alicyclic group, wherein $R^1$ represents hydrogen or lower alkyl;

Q represents oxygen or —$NR^1$— wherein $R^1$ represents hydrogen or lower alkyl; and X, Y each independently of the other represents hydrogen, fluorine, chlorine, cyano, alkyl optionally substituted by fluorine having 1 to 12 carbon atoms in which optionally one or more non-adjacent alkyl —$CH_2$— groups are replaced by —O—, —CO—O—, —O—CO— and/or —CH=CH—.

* * * * *